United States Patent
Trifaro et al.

(10) Patent No.: US 9,738,343 B2
(45) Date of Patent: Aug. 22, 2017

(54) ADULT TRICYCLES HAVING PIVOTING FRAMES, SUSPENSION SYSTEMS AND ENHANCED STABILITY

(71) Applicants: Michael Trifaro, Staten Island, NY (US); Christopher Trifaro, Staten Island, NY (US); Arnold Kamler, Parsippany, NJ (US)

(72) Inventors: Michael Trifaro, Staten Island, NY (US); Christopher Trifaro, Staten Island, NY (US); Arnold Kamler, Parsippany, NJ (US)

( * ) Notice: Subject to any disclaimer, the term of this patent is extended or adjusted under 35 U.S.C. 154(b) by 0 days.

(21) Appl. No.: 15/013,990

(22) Filed: Feb. 2, 2016

(65) Prior Publication Data

US 2016/0221628 A1  Aug. 4, 2016

Related U.S. Application Data

(60) Provisional application No. 62/211,466, filed on Aug. 28, 2015, provisional application No. 62/111,332, filed on Feb. 3, 2015.

(51) Int. Cl.
*B62K 5/06* (2006.01)
*B62M 1/38* (2013.01)
*B62J 1/00* (2006.01)
*B62K 5/00* (2013.01)

(52) U.S. Cl.
CPC .............. *B62K 5/06* (2013.01); *B62J 1/002* (2013.01); *B62M 1/38* (2013.01); *B62K 2005/001* (2013.01)

(58) Field of Classification Search
CPC .............. B62K 9/02; B62K 5/02; B62K 5/06
See application file for complete search history.

(56) References Cited

U.S. PATENT DOCUMENTS

| | | | | |
|---|---|---|---|---|
| 4,159,752 A | * | 7/1979 | Kanno | B62D 61/08 180/210 |
| 4,429,760 A | * | 2/1984 | Koizumi | B62D 61/08 180/215 |
| 5,685,553 A | | 11/1997 | Wilcox et al. | |
| D480,665 S | * | 10/2003 | Gunter | D12/112 |
| 6,830,255 B2 | * | 12/2004 | Cheng | B62K 3/002 180/227 |
| 8,066,089 B2 | * | 11/2011 | Murad | B62K 5/027 180/206.5 |
| 8,186,698 B2 | * | 5/2012 | Gunderson | B62K 5/02 280/210 |
| 8,696,008 B2 | | 4/2014 | Hoogendoorn | |

(Continued)

*Primary Examiner* — Kevin Hurley
(74) *Attorney, Agent, or Firm* — Doherty IP Law Group LLC

(57) ABSTRACT

An adult tricycle has a front frame and a rear frame that are pivotally connected together and a suspension for minimizing shock as the tricycle is driven over a surface. The suspension includes a shock absorbing element having a leading end that is pivotally connected with the front frame and a trailing end that is pivotally connected with the rear frame. The tricycle has a front wheel with a diameter that is bigger than the diameters of the rear wheels and a seat that sits higher than the diameter of the front wheel. The adult sized tricycle enables parents to ride cycles with small children and provides a safe, stable cycle for mature adults and senior citizens.

19 Claims, 23 Drawing Sheets

(56) References Cited

U.S. PATENT DOCUMENTS

| | | | |
|---|---|---|---|
| 8,820,461 B2* | 9/2014 | Shinde | B60K 1/04 |
| | | | 180/216 |
| 8,991,844 B2* | 3/2015 | Bricker | B62M 1/38 |
| | | | 280/259 |
| 2003/0141695 A1* | 7/2003 | Chen | B62K 15/008 |
| | | | 280/287 |
| 2009/0255747 A1* | 10/2009 | Kasaba | B62D 51/02 |
| | | | 180/208 |
| 2011/0056756 A1 | 3/2011 | Murad | |
| 2011/0074131 A1 | 3/2011 | Cho | |
| 2012/0104722 A1 | 5/2012 | Gunderson | |
| 2013/0075995 A1 | 3/2013 | Gunderson | |
| 2013/0075996 A1* | 3/2013 | Armbruster | B62K 9/02 |
| | | | 280/259 |
| 2013/0193668 A1* | 8/2013 | Decker | B62K 5/06 |
| | | | 280/261 |
| 2015/0054252 A1* | 2/2015 | Lee | B62K 5/025 |
| | | | 280/276 |

* cited by examiner

ADULT TRICYCLES HAVING PIVOTING FRAMES, SUSPENSION SYSTEMS AND ENHANCED STABILITY

CROSS-REFERENCE TO RELATED APPLICATIONS

The present patent application claims benefit of U.S. Provisional Application No. 62/211,466, filed Aug. 28, 2015, and U.S. Provisional Application No. 62/111,332, filed Feb. 3, 2015, the disclosure of which is hereby incorporated by reference herein.

BACKGROUND OF THE INVENTION

Parents love to engage in outdoor, physical activities with their children including playing sports, roller skating and bicycle riding. One of the greatest joys in life is when a parent and a child ride bicycles together in the neighborhood or at a local park.

Often, a parent may desire to ride along with a young child as the latter rides his or her tricycle or small bicycle. In many instances, due to the size of the child and the size of the cycle, a child rides his or her tricycle or small bicycle at a very slow speed, which makes it difficult for the adult to maintain balance on an adult-sized bicycle designed to travel at higher speeds. This leads to frustration and disappointment for both the parent and the child because they cannot easily and comfortably ride together on their respective cycles.

In addition, mature adults and senior citizens are often apprehensive to ride conventional bicycles because it becomes more and more difficult for adults to maintain their balance on bicycles as they age.

Thus, there is a need for an adult-sized tricycle that enables a fully grown adult to ride slowly next to his or her child, as the child rides his or her own tricycle or small bicycle. There also remains a need for an adult-sized tricycle that is able to handle the weight of a fully grown adult and that has enhanced stability and comfort. Moreover, there remains a need for an adult-sized tricycle that is easy to transport, ship, and store. In addition, there remains a need for an adult sized tricycle that provides a smooth, comfortable ride for adults of all ages.

SUMMARY OF THE INVENTION

In one embodiment, the present application discloses an adult-sized tricycle that enables a fully grown adult parent to ride slowly next to his child, as the child rides his or her own tricycle or small bicycle.

In one embodiment, the present application discloses an adult-sized tricycle having a foldable frame so that the adult sized tricycle can be collapsed for transport, shipping and/or storage. In one embodiment, the frame may be broken down into smaller parts.

In one embodiment, an adult-sized tricycle has a suspension coupled to the frame to provide for a more comfortable ride and minimize shock as the tricycle is driven over a surface. In one embodiment, the adult tricycle preferably has a front frame and a rear frame that are pivotally connected together. The suspension desirably includes a shock absorbing element having a leading end that is pivotally connected with the front frame and a trailing end that is pivotally connected with the rear frame. In one embodiment, the tricycle has a passenger seat that is mounted to the rear frame for enabling a passenger to ride behind the driver's seat.

In one embodiment, an adult tricycle has a front wheel and two rear wheels. Two pedals are connected with the front wheel for advancing the adult tricycle in a forward direction only. In one embodiment, the pedals may be used to rotate the front wheel in a forward direction, however, the pedals may not be used to rotate the front wheel in a reverse direction. In one embodiment, when the front wheel is rotating in a forward direction, the pedals may be held stationary and the front wheel may continue for rotate in the forward direction. In one embodiment, the front wheel includes a freewheel mechanism that allows the front wheel to turn at a rate of rotation that is different and/or faster than the pedals. If a freewheel mechanism were not provided on the front wheel of the adult tricycle, a simple ride could be exhausting, because a rider could never stop pumping the pedals. In addition, going downhill could be very dangerous because the pedals would turn with the front wheel at a much faster rate than an adult rider could keep up with.

In one embodiment, an adult tricycle includes a front frame having a leading end and a trailing end, a rear frame having a leading end and a trailing end, and a pivot connection that pivotally connects the trailing end of the front frame with the leading end of the rear frame. The front and rear frames may be made of metal. In one embodiment, a suspension system couples the front and rear frames together for dampening pivoting movement of the front and rear frames relative to one another. In one embodiment, the adult tricycle has a front wheel mounted on the leading end of the front frame, and a pair of rear wheels rotatably mounted on the trailing end of the rear frame. A seat is mounted to an upper end of the front frame. In one embodiment, the front and rear wheels are adapted to ride over a riding surface, whereby the distance between the seat and the riding surface is greater than the diameter of the front wheel.

In one embodiment, the diameter of the front wheel is at least 1.5 times greater than the diameter of each of the rear wheels. In one embodiment, the diameter of the front wheel is about 20 inches, each of the rear wheels has a diameter of about 10-12 inches, and the distance between the seat and the riding surface is about 27-29 inches.

In one embodiment, the suspension system includes a shock absorber including a spring and a telescoping shaft having a longitudinal shaft that controls compression of the shock absorber along the longitudinal axis of the telescoping shaft. In one embodiment, the shock absorber has a leading end pivotally coupled with the trailing end of the front frame and a trailing end pivotally coupled with the leading end of the rear frame.

In one embodiment, the front frame includes a rigid Y-shaped structure having a horizontally-extending first section, a sloping second section, and a seat bar that is connected with trailing ends of the horizontally-extending first section and the sloping second section.

In one embodiment, the rear frame includes first and second rigid loop-shaped parts, a laterally extending support bar that interconnects leading ends of the first and second rigid loop-shaped parts, and a top plate that interconnects upper portions of the first and second rigid loop-shaped parts.

In one embodiment, an adult tricycle includes a front frame having a leading end and a trailing end, the trailing end of the front frame including a seat bar having an upper end and a lower end, a seat mounted on the upper end of the seat bar, a rear frame having a leading end and a trailing end, and a pivot connection located adjacent the lower end of the seat bar for pivotally connecting the trailing end of the front frame with the leading end of the rear frame.

In one embodiment, the adult tricycle includes a suspension system having a leading end pivotally connected with the seat bar of the front frame and a trailing end pivotally connected with the rear frame for dampening pivoting movement of the front and rear frames relative to one another.

In one embodiment, a front wheel is rotatably mounted on the leading end of the front frame and a pair of pedals is coupled with the front wheel. In one embodiment the front wheel has a freewheel mechanism that enables the front wheel to rotate faster than the pair of pedals. In one embodiment, the pedals may be pumped to move forward, however, the pedals are incapable of being pumped to move the adult tricycle in a rearward direction.

In one embodiment, a pair of rear wheels is rotatably mounted on the trailing end of the rear frame and the rear wheels are free to rotate relative to the rear frame. In one embodiment, the front wheel has a diameter that is at least 1.5 times greater than the diameters of the respective rear wheels. The front and rear wheels may be pneumatic rubber tires that are filled with air, or may be made of plastic or polymers.

In one embodiment, the suspension system includes a shock absorber having a spring and a telescoping shaft with a longitudinal shaft that controls compression of the shock absorber along the longitudinal axis of the telescoping shaft. In one embodiment, a leading end of the longitudinal shaft is pivotally connected with a midsection of the seat bar, which is located between the upper and lower ends of the seat bar.

In one embodiment, the rear frame includes two rigid loop-shaped parts that are laterally space from one another, each of the rigid loop-shaped part having a leading end and a trailing end. In one embodiment, a first laterally extending support, such as a bar, interconnects the leading ends of the two rigid loop-shaped parts, and a second laterally extending support, such as a laterally extending support plate, interconnects upper sections of the two rigid loop-shaped parts. In one embodiment, a double rear axle is connected with the trailing ends of the two rigid loop-shaped parts, whereby the rear wheels are rotatable mounted on outer ends of the double rear axle.

In one embodiment, the double rear axle includes a first axle bar extending laterally at the trailing end of the rear frame, a second axle bar extending laterally at the trailing end of the rear frame, a first stabilizer plate connected with the first and second axle bars, and a second stabilizer plate spaced from the first stabilizer plate and being connected with the first and second axle bars. In one embodiment, the first stabilizer plate is connected with the trailing end of a first one of the two rigid loop-shaped parts, and the second stabilizer plate is connected with the trailing end of a second one of the two rigid loop-shaped parts.

In one embodiment, an adult tricycle includes a pair of handle bars coupled with the front wheel for steering the adult tricycle. In one embodiment, a hand brake is attached to one of the handle bars for applying a braking force upon the front wheel.

In one embodiment, an adult tricycle includes a front frame having a leading end and a trailing end, the front frame including a seat bar and a seat mounted on an upper end of the seat bar, a rear frame having a leading end and a trailing end, and a pivot connection located adjacent a lower end of the seat bar for pivotally connecting the trailing end of the front frame with the leading end of the rear frame. In one embodiment, the adult tricycle includes a suspension system having a leading end pivotally connected with the seat bar and a trailing end pivotally connected with the rear frame for dampening pivoting movement of the front and rear frames relative to one another.

In one embodiment, the adult tricycle includes a front wheel mounted on the leading end of the front frame and a pair of pedals coupled with the front wheel, whereby the front wheel has a freewheel mechanism that enables the front wheel to rotate faster than the pair of pedals. In one embodiment, the adult tricycle includes a pair of rear wheels rotatably mounted on the trailing end of the rear frame and which are free to rotate relative to the rear frame. In one embodiment, the front and rear wheels are adapted to travel over a riding surface. In one embodiment, the front wheel has a diameter that is greater than the diameters of the rear wheels, and the distance between the seat and the riding surface is greater than the diameter of the front wheel.

These and other preferred embodiments of the present invention will be described in more detail below.

DETAILED DESCRIPTION

Figure 1:
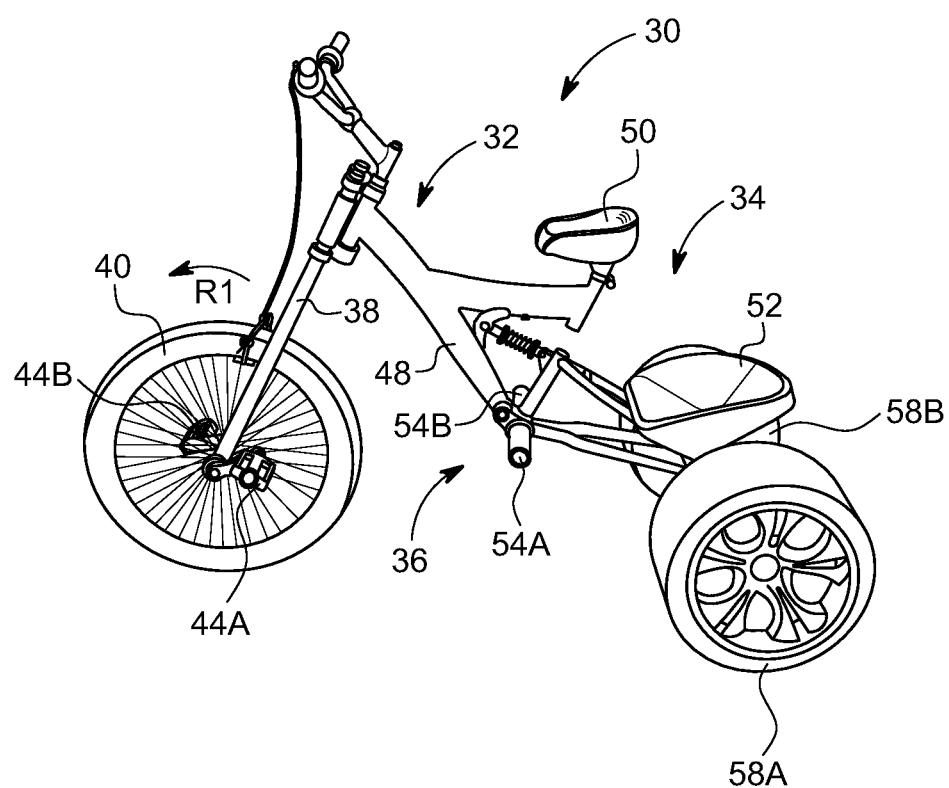
FIG. 1 shows a side view of an adult tricycle having a front frame and a rear frame pivotally connected together, in accordance with one embodiment of the present invention.
Figure 2:
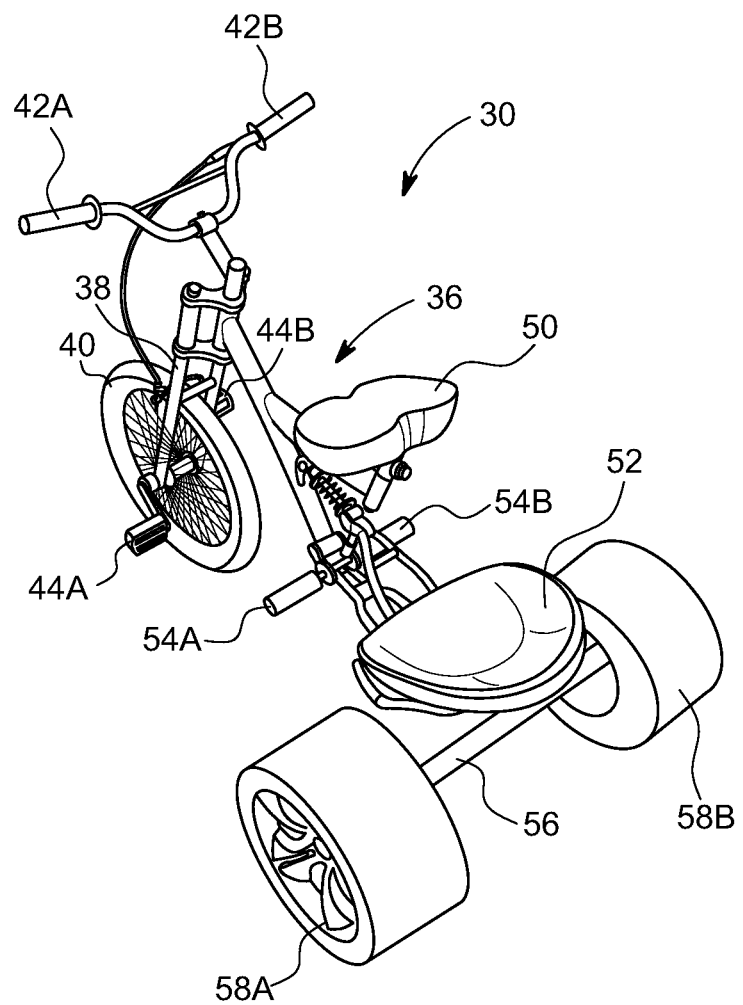
FIG. 2 shows a rear perspective view of the adult tricycle shown in FIG. 1.

Referring to FIGS. 1 and 2, in one embodiment, an adult tricycle 30 preferably includes a front frame 32 and a rear frame 34 that are connected together at a mid-section 36. In one embodiment, the front and rear frames are pivotally connected together. The front and rear frames may be disassembled from one another for packaging/shipment/transport, and later assembled together upon reaching a desired location. In one embodiment, the front frame 32 preferably includes a front fork 38, a front wheel 40 connected to a lower end of the front fork 38, and handle bars 42A, 42B connected with the front wheel 40 for steering the adult tricycle.

The adult tricycle 30 desirably has pedals 44A, 44B connected with the front wheel 40. The pedals 44 may be cranked (e.g., using the driver's feet) for rotating the front wheel 40 in a forward direction designated R1. The pedals 44 are designed to "free-wheel" relative to a rotating front wheel. Thus, when the front wheel 40 is rotating and a rider stops pedaling, the pedals 44 will remain stationary as the front wheel 40 continues to rotate in the direction R1. In one embodiment, the pedals 44 may only be used to advance the adult tricycle 30 in a forward direction, and the pedals 44 may not be used to back-up the adult tricycle in a rear direction that is opposite the forward direction. In one embodiment, the pedals may be used to go in both the forward and reverse directions.

In one embodiment, the front frame 32 has a Y-shape including a horizontally-extending first section 46 and a sloping second section 48. A rider seat 50 is preferably secured to a trailing end of the horizontally-extending first section 46. A trailing end of the sloping second section 48 of the front frame 32 is desirably pivotally connected with a leading end of the rear frame 34 (e.g., pivotally connected) as will be described in more detail herein.

In one embodiment, the rear frame 34 of the adult tricycle 30 desirably has a triangular shape. A passenger seat 52 may be mounted on the rear frame 34 and located behind the rider seat 50. A pair of passenger foot rests 54A, 54A project laterally from opposite sides of the trailing end of the sloping second section 48 of the rear frame 34.

The adult tricycle 30 desirably includes a rear axle 56 that is connected with a trailing end of the rear frame 34. The rear axle 56 preferably has outer ends, and first and second rear wheels 58A, 58B are rotatably secured to the respective outer ends of the rear axle 56.

In one embodiment, the front wheel 40 has a diameter of about 18-22 inches and more preferably about 20 inches. In one embodiment, the front wheel 40 is made of rubber having a width of about 2-3 inches and more preferably about 2.5 inches. In one embodiment, the rubber front wheel is filled with air. In one embodiment, the rears wheels 58A, 58B have a diameter of about 10-14 inches and more preferably about 13 inches, and a width of about 7-9 inches and more preferably about 8 inches. In one embodiment, the rear wheels are made of plastic or polymer material. In one embodiment, the rear wheels are made of rubber and are filled with air.

In one embodiment, when the adult tricycle is placed upon a surface for riding, the seating surface of the seat 50 has a height of about 25-30 inches above the ground and more preferably about 27-29 inches above the ground. In one embodiment, the height of the seat 50 may be adjusted. In one embodiment, the front wheel 40 has a greater diameter than the rear wheels 58A, 58B and the seat 50 sits higher than the diameter of the front wheel. The height of the seat 50 (i.e., 25-30 inches above the ground), makes it easier for adults to mount and dismount the adult tricycle.

Figure 3:
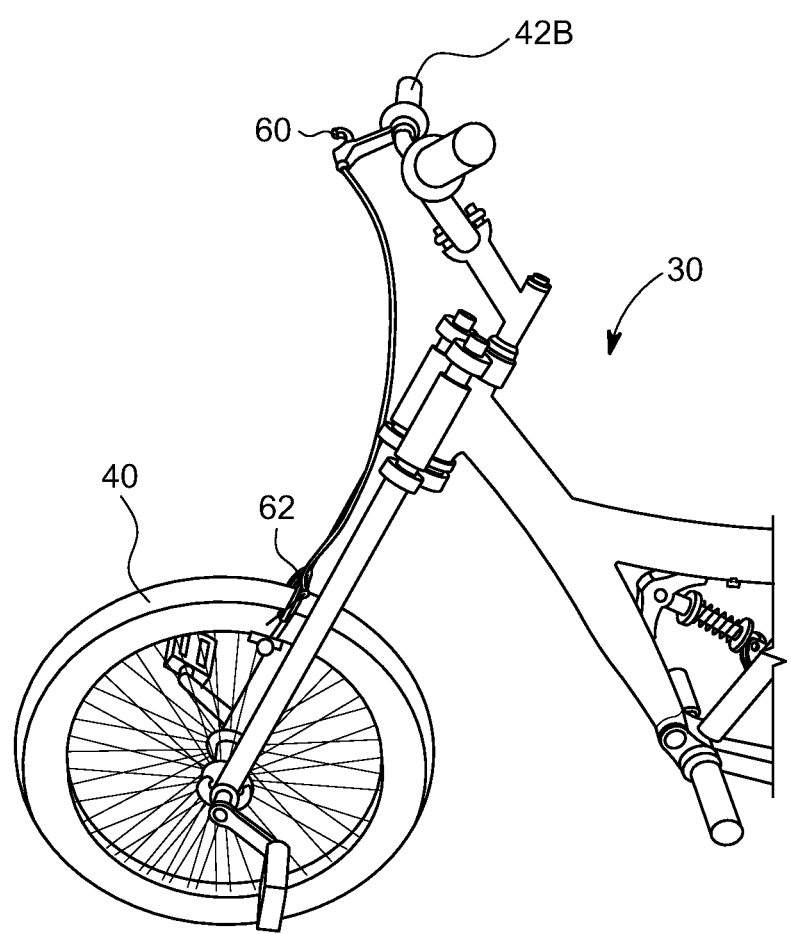
FIG. 3 shows a side view of the front frame of the adult tricycle shown in FIGS. 1 and 2.
Figure 4:
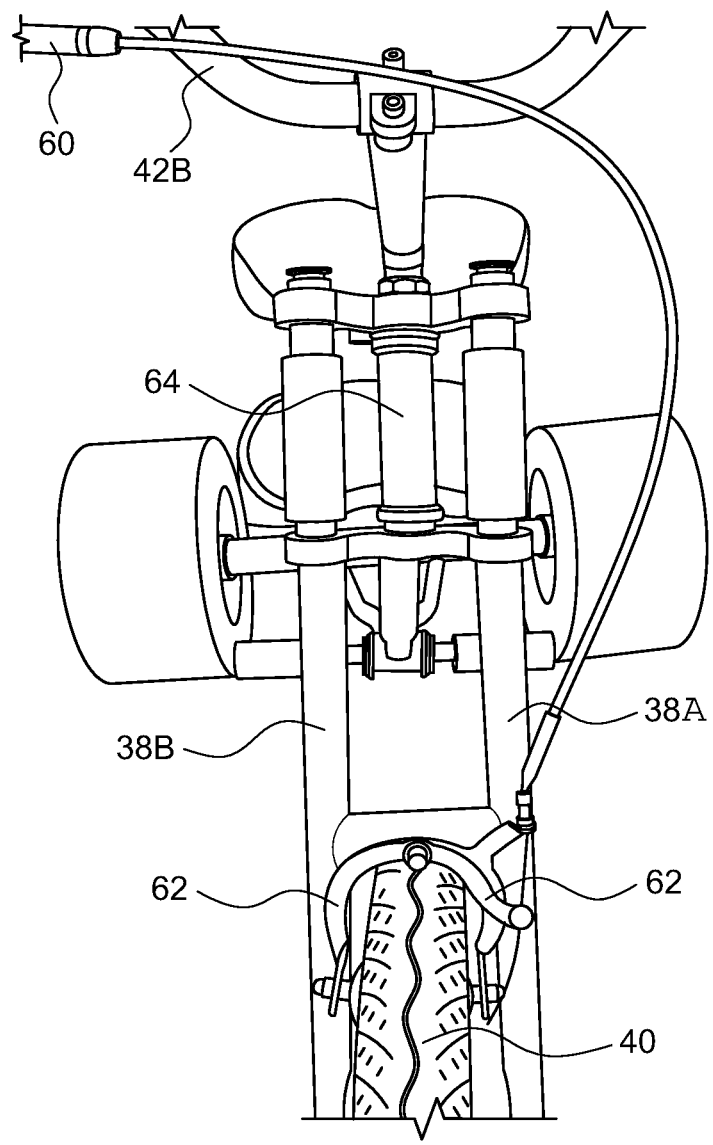
FIG. 4 shows a front view of the adult tricycle shown in FIGS. 1 and 2.
Figure 5:
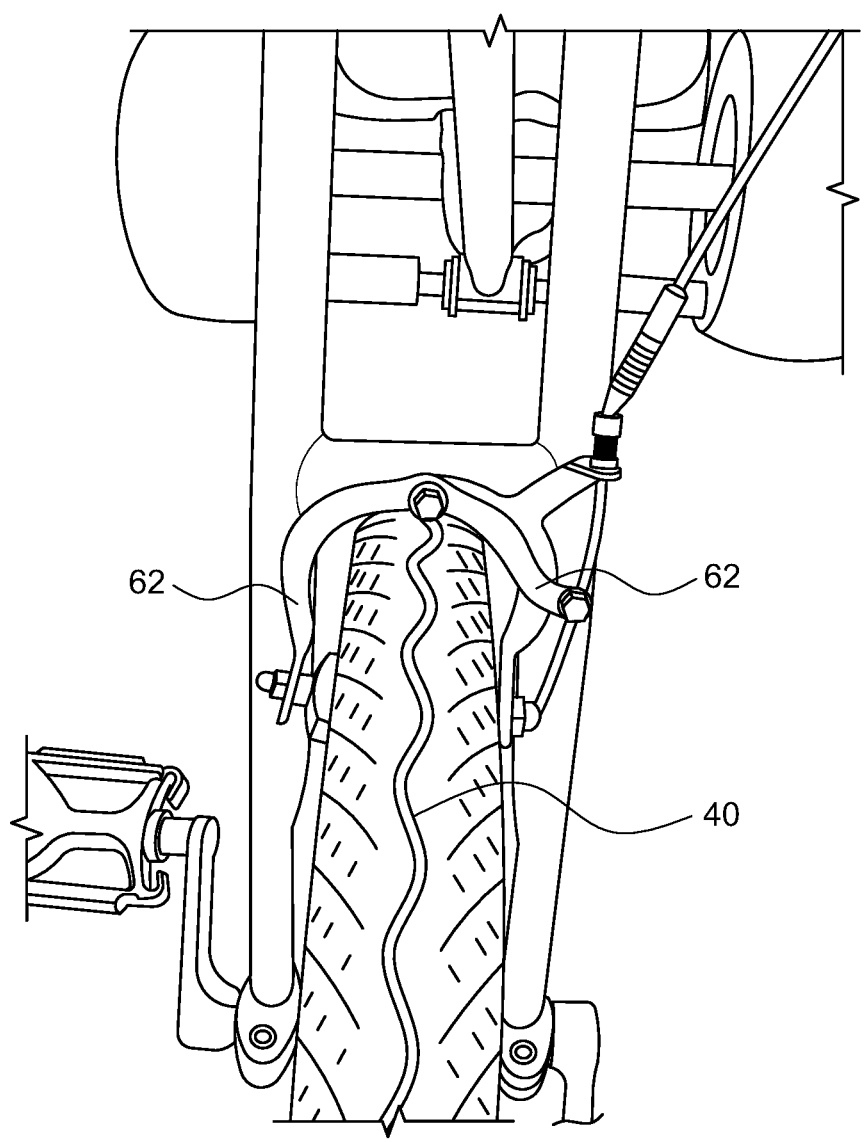
FIG. 5 shows another front view of the adult tricycle shown in FIG. 4.

Referring to FIGS. 3-5, in one embodiment, the adult tricycle 30 has a hand brake 60 that is mounted on the right handle bar 42B. The hand brake 60 is preferably coupled with brake calipers 62 mounted adjacent the front wheel 40. In order to brake, a rider may squeeze the hand brake 60, which, in turn, closes the brake calipers 62 onto the rim of the front wheel 40 for stopping the adult tricycle.

Referring to FIG. 4, the front frame 32 includes the fork 38 having lower ends that extend over opposite sides of the front wheel 40. A vertically extending bar 64 at the leading end of the front frame 32 and the fork 38 forms a triple tree structure that limits how far the front wheel 40 may be turned to the left and to the right. When the front wheel 40 is turned fully to the left, the left fork 38A contacts the front frame to function as a hard stop to limit the extent of turning to the left. When the front wheel 40 is turned fully to the right, the right fork 38B contacts the front frame to function as a hard stop to limit the extent of turning to the right.

Figure 6:
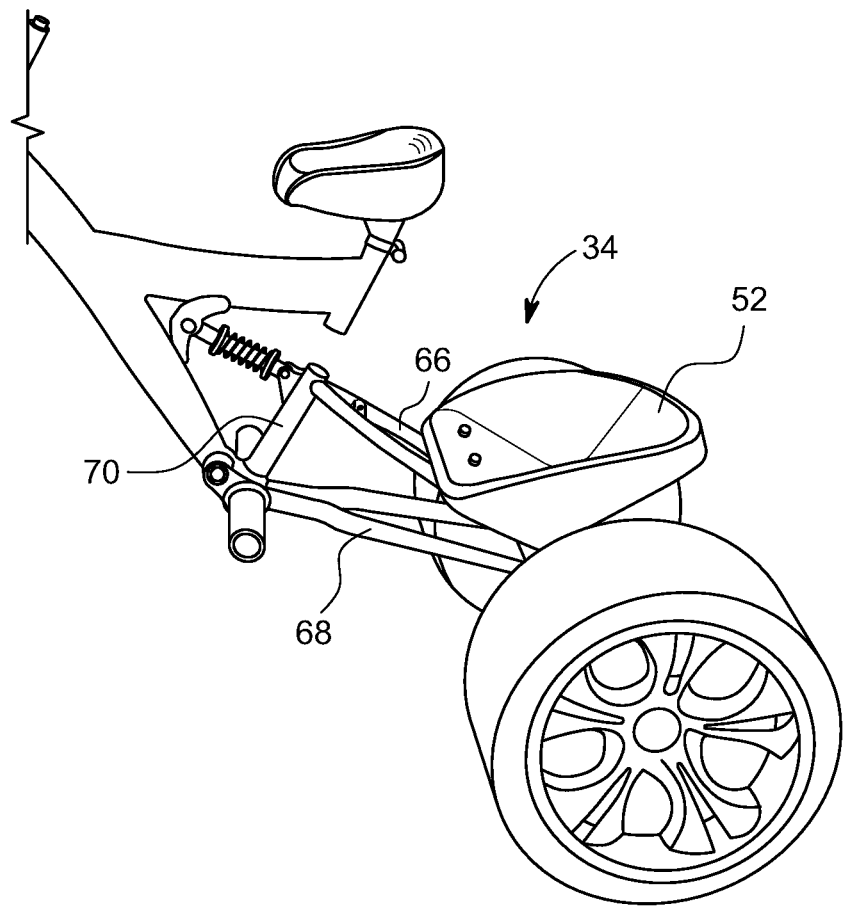
FIG. 6 shows a side view of the rear frame of the adult tricycle shown in FIGS. 1 and 2.

Referring to FIG. 6, in one embodiment, the rear frame 34 has a triangular shape when viewed from the side including a top section 66, a bottom section 68, and a vertically extending section 70 that interconnects the leading ends of the top section 66 and the bottom section 68. In one embodiment, the rears ends of the top and bottom sections 66, 68 are connected together to form the triangular shaped structure described above. The passenger seat 52 is mounted to the top section 66 of the rear frame 34. In one embodiment, the passenger seat is designed to seat a child directly behind an adult who is driving the adult tricycle. As a result, a child and a parent/adult may ride and play together.

Figure 7:
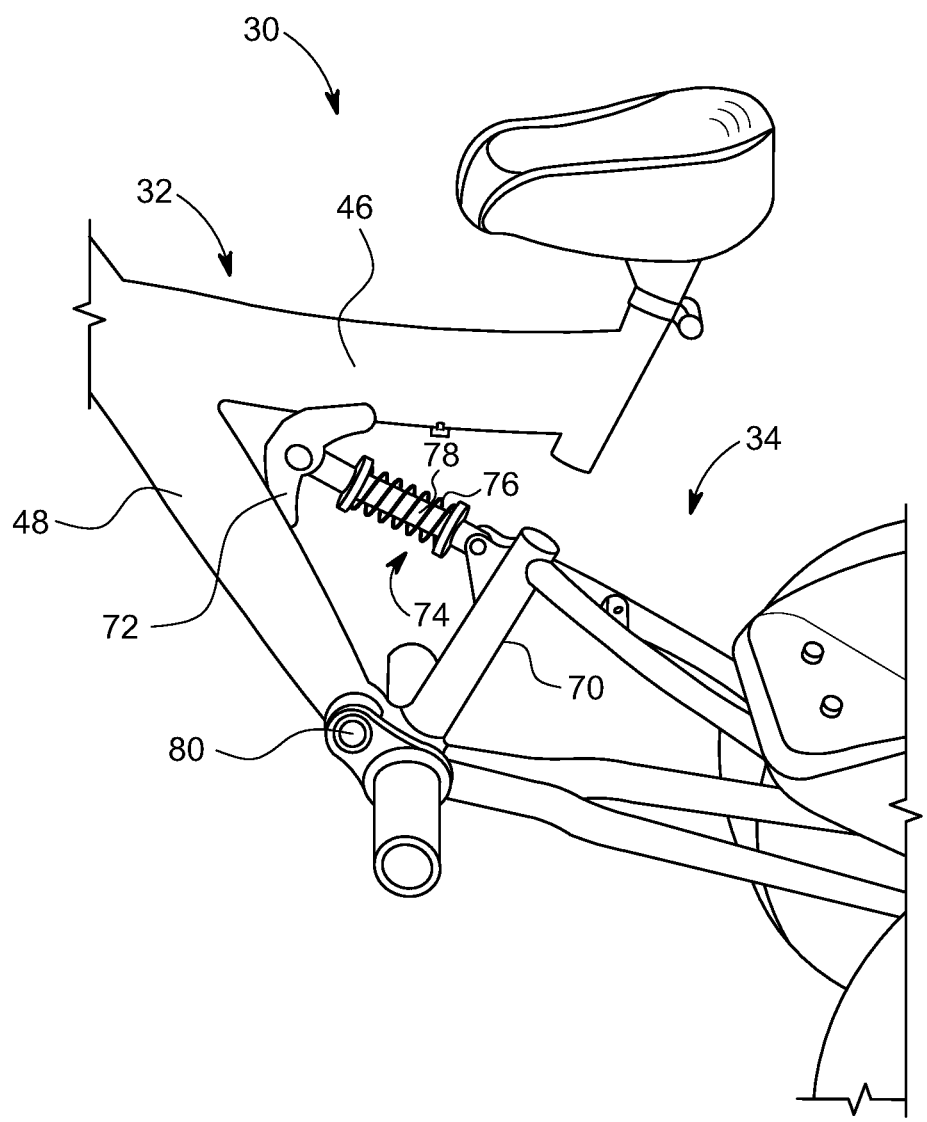
FIG. 7 shows a side view of a mid-section of the adult tricycle shown in FIGS. 1 and 2.
Figure 8:
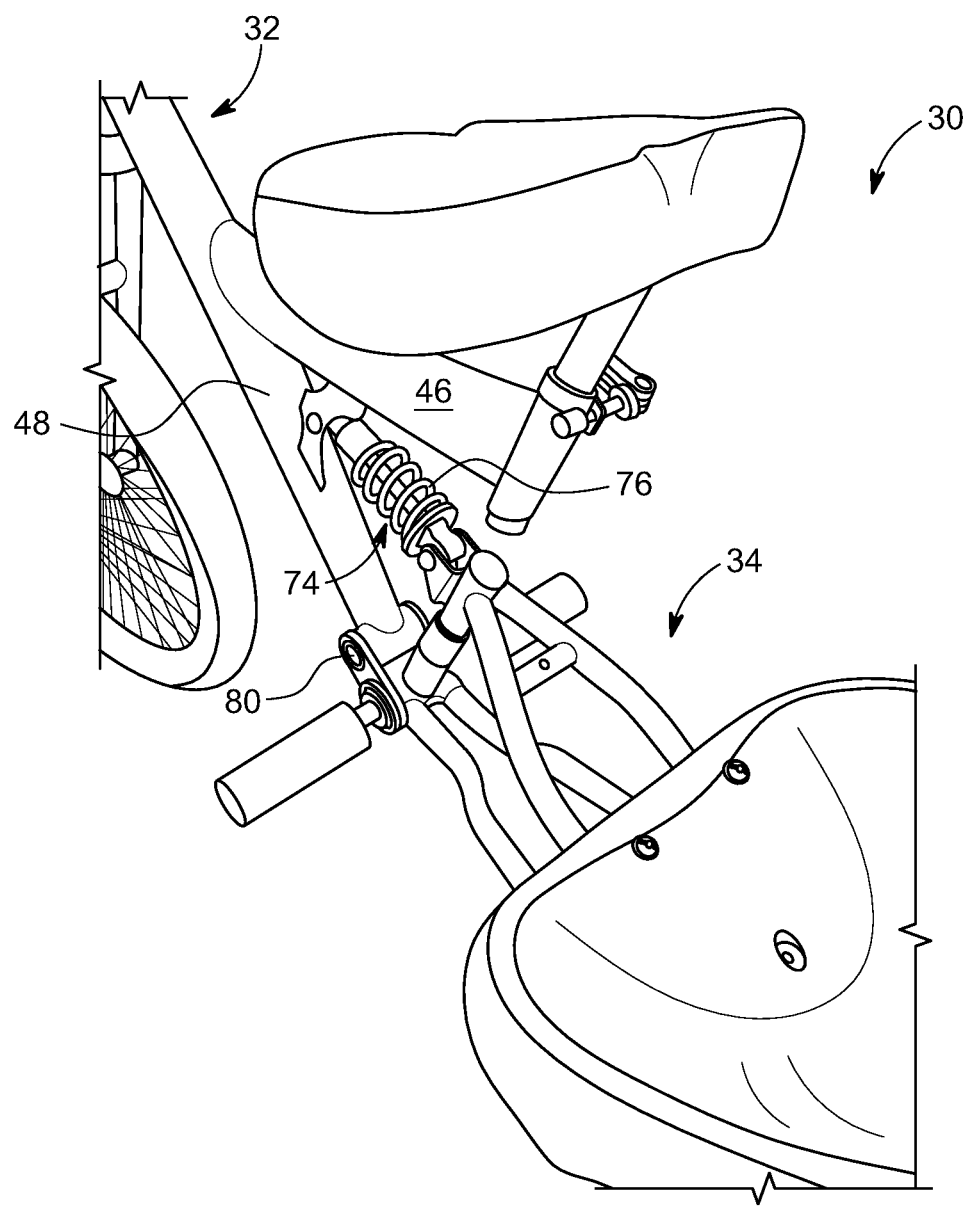
FIG. 8 shows a rear perspective view of the mid-section of the adult tricycle shown in FIG. 7.

Referring to FIGS. 7 and 8, in one embodiment, the front and rear frames 32, 34 are connected together at a mid-section of the adult tricycle 30. The front and rear frames 32, 34 are desirably pivotally connected together and include a shock absorbing element that dampens bumps and jolts as a driver rides the adult tricycle.

In one embodiment, the front frame 32 includes a support buttress 72 that extends between the horizontally-extending first section 46 and the sloping second section 48 of the front frame. The adult tricycle 30 preferably includes a shock absorbing element 74 having a leading end that is pivotally connected with the support buttress 72 and a trailing end that is pivotally connected with the upper end of the vertically extending section 70 of the rear frame 34. In one embodiment, the shock absorbing element 74 desirably includes a spring 76 and a telescoping shaft 78 that controls compression of the shock absorbing element along the longitudinal axis of the telescoping shaft 78.

In one embodiment, the trailing end of the sloping second section 48 of the front frame 32 is desirably pivotally connected with the rear frame 34, at a location that is adjacent the lower end of the vertically extending section 70 of the rear frame 34. In one embodiment, a split locking collar 80 may be used for forming the pivotal connection between the front frame 32 and the rear frame 34.

Figure 9:
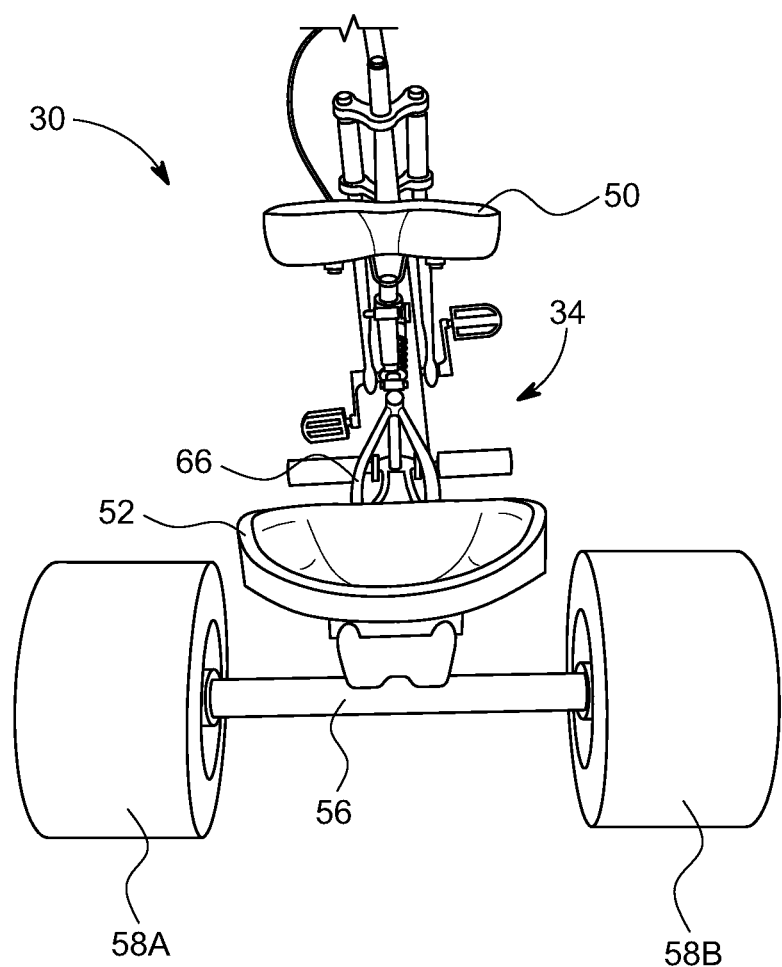
FIG. 9 shows a rear view of the adult tricycle shown in FIGS. 1 and 2.

Referring to FIG. 9, in one embodiment, the passenger seat 52 is mounted onto the top section 66 of the rear frame 34. The passenger seat 52 is desirably located behind the driver seat 50 and is preferably aligned with the driver seat along the length of the adult tricycle 30.

Figure 10:
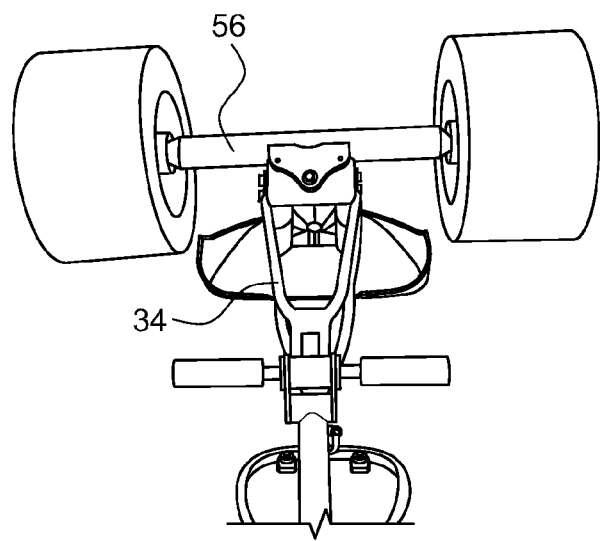
FIG. 10 shows a bottom view of the rear frame of the adult tricycle shown in FIG. 6.
Figure 11:
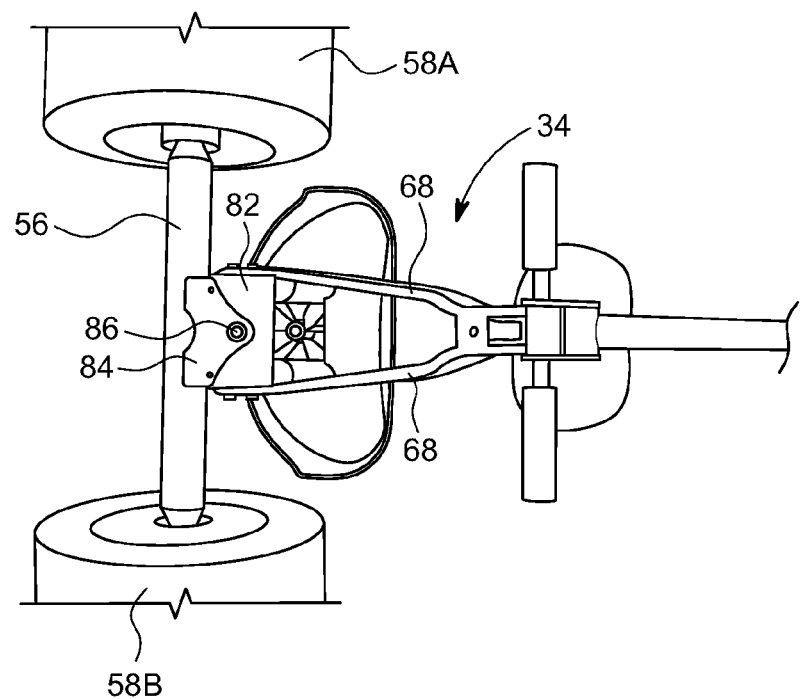
FIG. 11 shows another bottom view of the rear frame of the adult tricycle shown in FIGS. 6 and 10.
Figure 12:
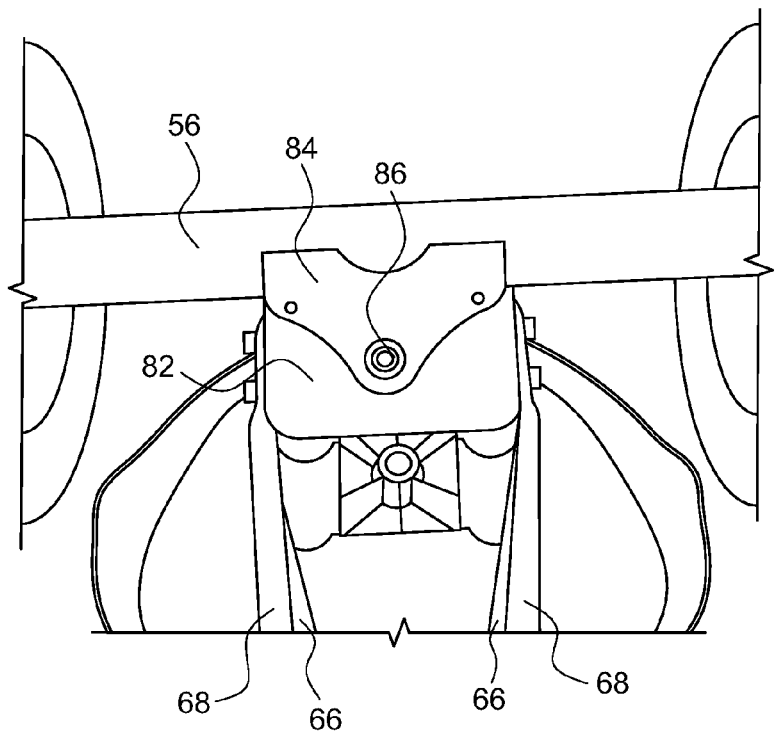
FIG. 12 shows a bottom view of the adult tricycle shown in FIG. 11 including the rear frame, a rear axle housing encasing the rear axle, and a junction box used for connecting the rear frame with the rear axle housing, in accordance with one embodiment of the present invention.
Figure 13:
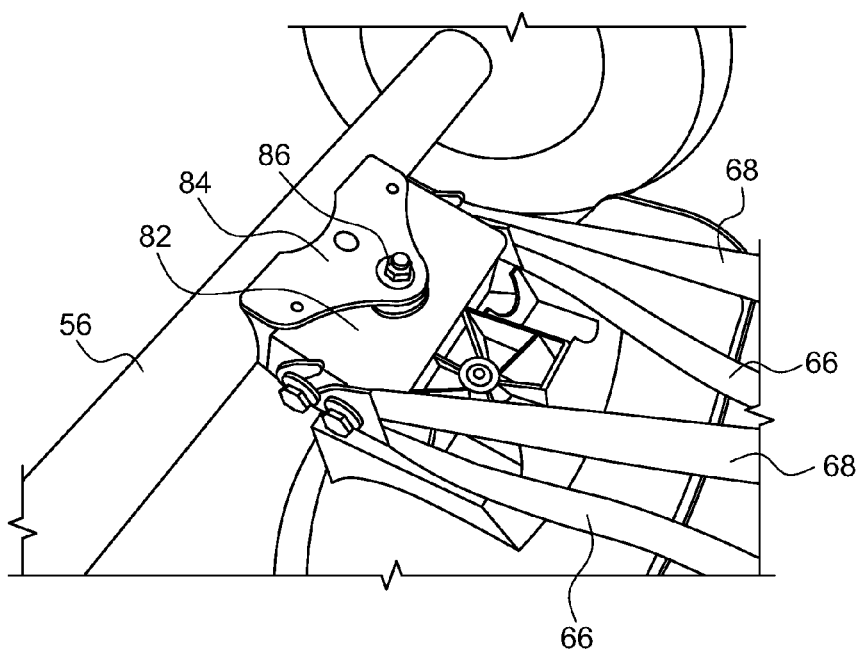
FIG. 13 shows a perspective view of the rear frame, the rear axle, and the junction box shown in FIG. 12.
Figure 14:
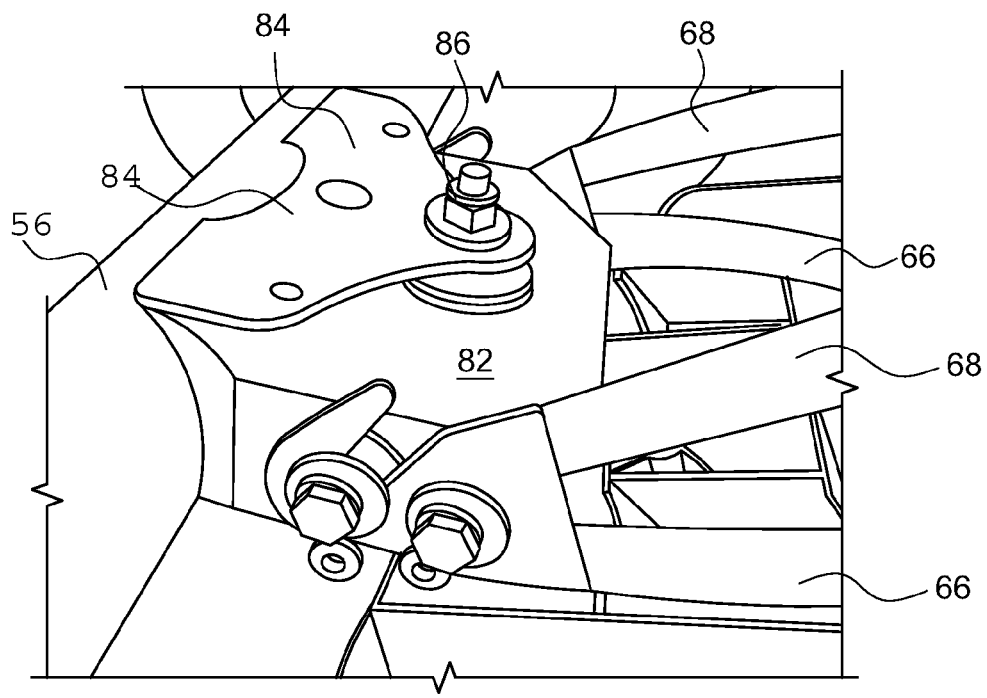
FIG. 14 shows a side view of the rear frame, the rear axle housing, and the junction box shown in FIG. 13.

Referring to FIGS. 9-11, the rear axle 56 is connected with the trailing end of the rear frame 34. The rear axle 56 extends laterally along the rear of the tricycle and first and second rear wheels 58A, 58B are rotatably mounted to the respective outer ends of the rear axle 56.

Referring to FIGS. 11-14, in one embodiment, a stabilizer 82 is utilized for interconnecting the rear frame 34 with the rear axle 56 and maximizing torsional stability between the rear frame and the rear axle. In one embodiment, a mounting plate 84 is welded to the rear axle 56. The trailing ends of the upper and lower sections 66, 68 of the rear frame 34 are split and the stabilizer 82 is positioned between the split trailing ends. The mounting plate 84 is secured to the bottom surface of the stabilizer 82 using a threaded fastener and a locking bolt 86. The stabilizer 82 has a pair of laterally extending bores formed therein (not shown). A first bolt is passed through the first laterally extending bore and a second bolt is passed through the second laterally extending bore. The outer ends of the first and second bolts have threads. Locking nuts are fastened onto the ends of the first and second bolts for securing the split trailing ends of the upper and lower sections 66, 68 of the rear frame 34 to the stabilizer 82.

Figure 15:
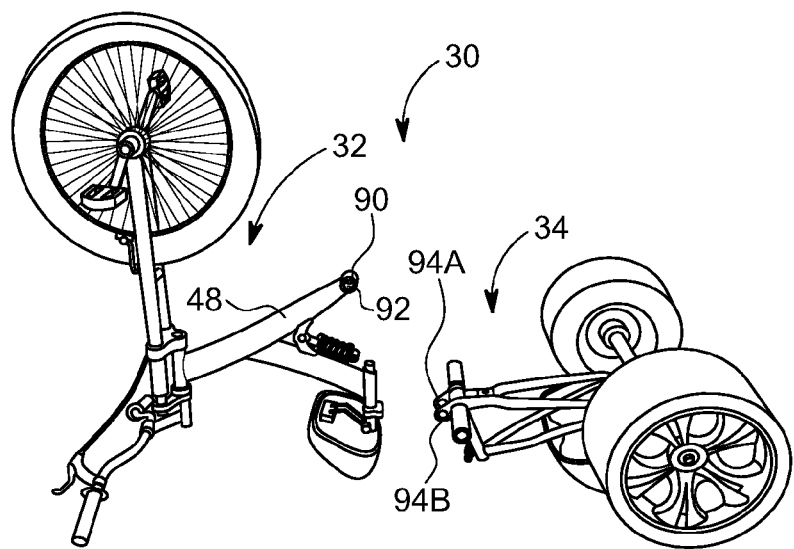
FIG. 15 shows a side view of a partially assembled adult tricycle before a front frame and a rear frame are assembled together, in accordance with one embodiment of the present invention.

Referring to FIG. 15, the adult tricycle 30 preferably has two parts, the front frame 32 and the rear frame 34, that may be assembled together. Providing two parts for the tricycle may make it easier to package, ship and/or transport the tricycle. In one embodiment, the tricycle is packaged in two separate parts, which facilitates shipping and/or transporting the tricycle. When a final destination is reached (e.g., a retail establishment, a home), the front and rear frames 32, 34 may be assemble together.

In one embodiment, a sloping section 48 of the front frame has a trailing end including a bearing 90 with a laterally extending opening 92 passing through the bearing 90. The leading end of the rear frame 34 preferably has a pair of spaced apart mounting flanges 94A, 94B, each mounting flange having an opening extending therethrough.

Figure 16A:
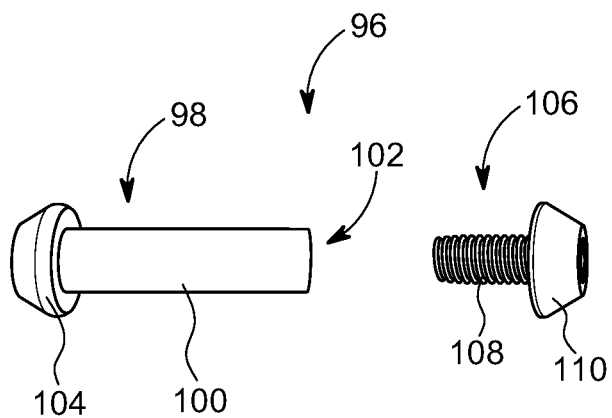
FIGS. 16A and 16B show a locking assembly used for connecting a shock absorbing element with a rear frame of an adult tricycle, in accordance with one embodiment of the present invention.
Figure 16B:
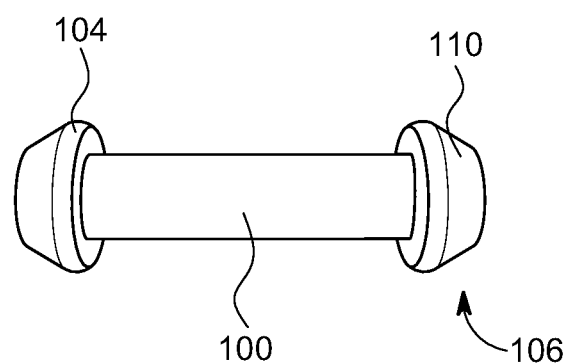

Referring to FIGS. 16A and 16B, in one embodiment, a split locking bolt 96 is used for pivotally securing the shock absorbing element 74 (FIG. 7) with the rear frame (FIG. 15). The split locking bolt 96 includes a female part 98 having an elongated cylindrical shaft 100 with an internally threaded female opening 102 at a first end and a shoulder 104 at an opposite, second end. The diameter of the shoulder 104 is larger than the diameter of the elongated cylindrical shaft 100. The split locking bolt 96 preferably includes a male part 106 having an externally threaded shaft 108 and a shoulder 110 opposite the externally threaded shaft 108. In order to assembled the female part 98 and the male part 106 together, the threaded shaft 108 is preferably inserted into the internally threaded female opening 102 and tightened until the shoulder 110 on the male part abuts against the free end of the elongated cylindrical shaft 100. When the male and female parts are assembled together, the shoulders 104, 110 bound the ends of the elongated cylindrical shaft 100.

Figure 17:
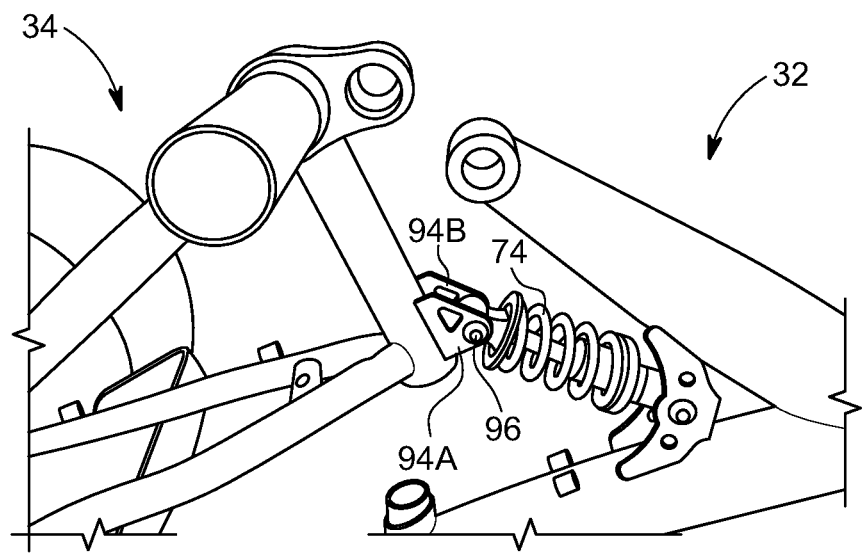
FIG. 17 shows a side view of an adult tricycle including the locking assembly of FIGS. 16A and 16B connecting a shock absorbing element with the rear frame of an adult tricycle.

Referring to FIG. 17, in one embodiment, the split locking bolt 96 (FIGS. 16A, 16B) is passed through the openings of the mounting flanges 94A, 94B of the rear frame 34 for pivotally connecting the trailing end of the shock absorbing element 74 with the mounting flanges of the rear frame, which, in turn, pivotally connects the trailing end of the shock absorbing element with the rear frame 34.

Figure 18A:
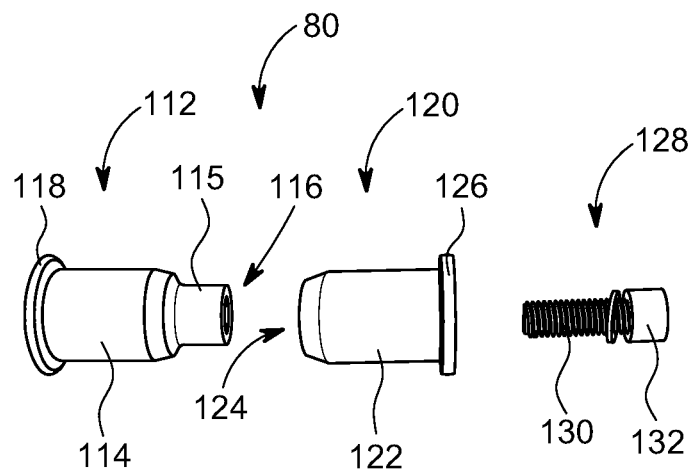
FIGS. 18A and 18B show a split collar locking assembly used for pivotally connecting a front frame of an adult tricycle to a rear frame of the adult tricycle, in accordance with one embodiment of the present invention.
Figure 18B:
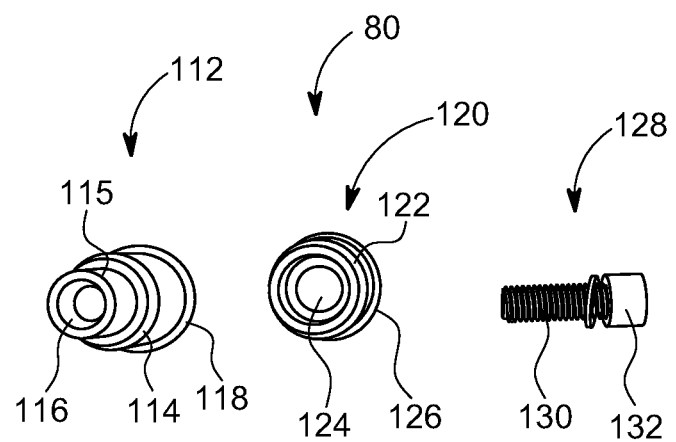

Referring to FIGS. 18A-18B, the split locking collar 80 (FIGS. 7 and 8) preferably includes a first part 112 having a cylindrical shaft 114 with a reduced diameter section 115, an internally threaded female opening 116 at a first end, and a shoulder 118 at an opposite, second end. The split locking collar 80 preferably includes a second part 120 having a cylindrical shaft 122 having a non-threaded female opening 124 at a first end and a shoulder 126 at an opposite second end. The split locking collar 80 desirably includes a threaded fastener 128 having a threaded shaft 130 and a head 132 with an Allen wrench depression formed therein. The reduced diameter section 115 of the first part 112 is preferably smaller than the inner diameter of the female opening 124 of the second part so that the reduced diameter section 115 of the first part 112 can slide into the female opening 124 of the second part 120.

Figure 19A:
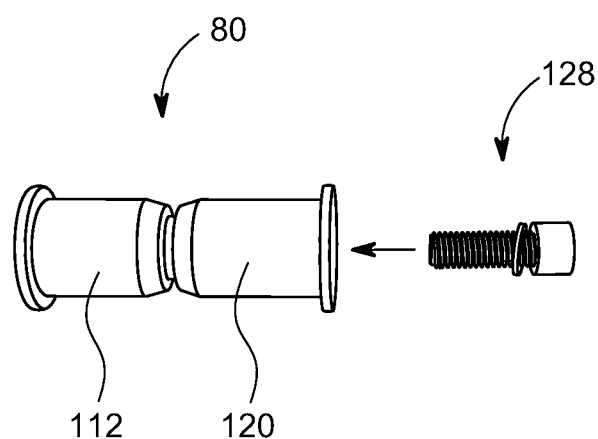
FIGS. 19A and 19B show a method of assembling the split collar locking assembly of FIGS. 18A and 18B, in accordance with one embodiment of the present invention.
Figure 19B:
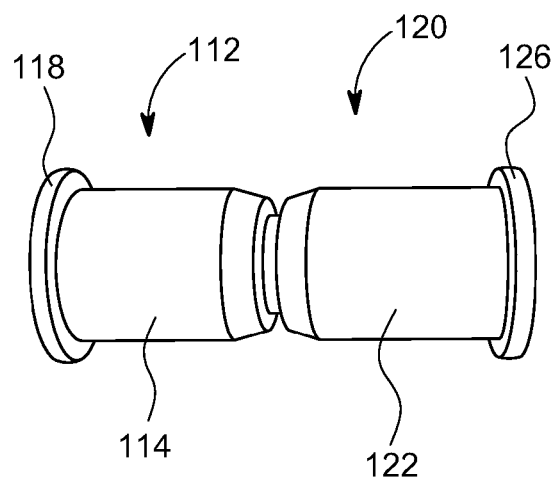

FIG. 19A shows the split locking collar 80 after the first and second parts 112, 120 have been assembled together. Referring to FIGS. 19A and 19B, the threaded fastener 128 is then inserted into an opening at the shoulder end of the second part 120 so that the threads 130 may mesh with the female threads of the first part for locking the first and second parts 112, 120 together. The respective shafts 114, 122 preferably have the same outer diameter. The shoulders 118, 126 have larger diameters than the diameters of the shafts 114, 122.

Figure 20:
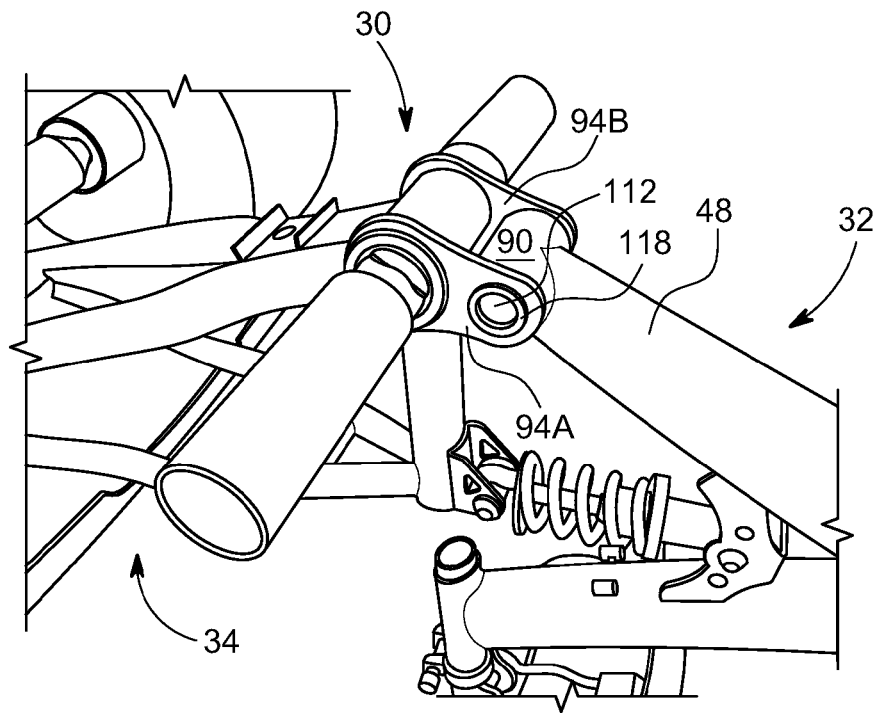
FIGS. 20 and 21 show the split collar locking assembly pivotally connecting front and rear frames of an adult tricycle, in accordance with one embodiment of the present invention.
Figure 21:
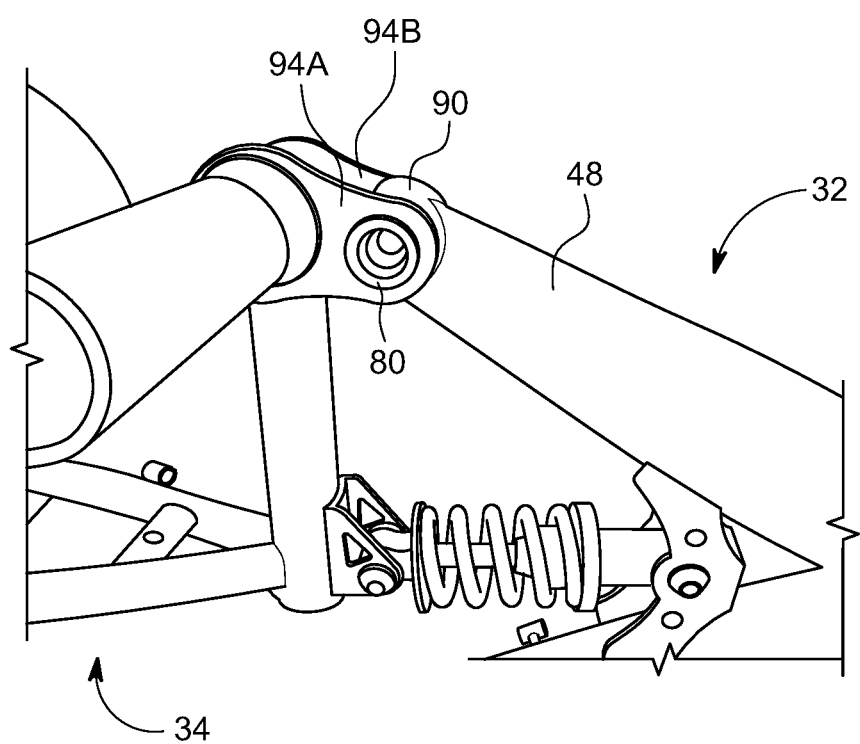

Referring to FIGS. 20 and 21, in one embodiment, the front frame 32 of the adult tricycle 30 is pivotally connected with the rear frame 34 of the adult tricycle by positioning the bearing 90 at the trailing end of the sloping section 48 of the front frame 32 between the spaced attachment flanges 94A, 94B at the leading end of the rear frame 34. The openings in the spaced attachment flanges 94A, 94B are preferably aligned with the elongated opening that passes through the bearing 90. The first and second parts 112, 120 of the split locking collar 80 are inserted into the openings at the opposite ends of the elongated opening extending through the bearing 90. The shoulder 118 of the first part 112 of the split locking collar preferably sits within a ring shaped depression formed in the outer surface of the first attachment flange 94A. The opposing shoulder 126 (FIG. 19B) sits is a ring shaped depression (not shown) formed in the second attachment flange 94B. The threaded fastener 128 (FIG. 19A) is then utilized for locking the first and second parts 112, 120 of the split locking collar together.

FIG. 21 shows the split locking collar 80 inserted into the elongated bore 90. The split locking collar has an internally threaded female opening. The threaded fastener is threaded into the internally threaded female opening to locking the first and second parts of the split locking collar together.

Although the present invention is not limited by any particular theory of operation, it is believed that the split locking collar 80 shown and described herein effectively pivotally couples the front frame and the rear frame together while controlling and minimizing torsional and twisting movement of the front and rear frames relative to one another. The front and rears frames are free to pivot relative to one another over the cylindrical shafts 114, 122 of the split locking collar 80, while the shoulders 118, 126 of the split locking collar clamp the respective attachment flanges 94A, 94B onto the ends of the elongated bearing 90 to minimize twisting and/or torsional movement of the front and rear frames 32, 34 relative to one another.

Figure 22:
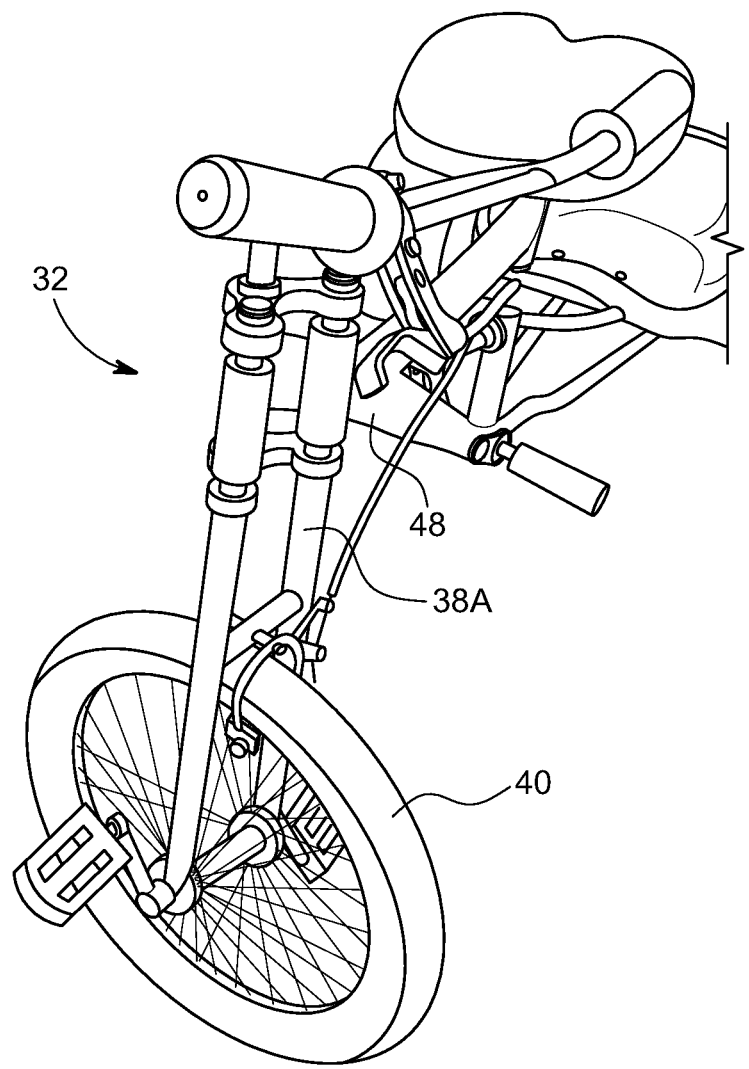
FIG. 22 shows an adult tricycle having a triple tree frame structure for limiting turning of a front wheel, in accordance with one embodiment of the present invention.

FIG. 22 shows the front wheel 40 turned fully to the left. The left front fork 38A engages the sloping section 48 of the front frame 32 to limit how far the front wheel may be turned to the left. The triple tree structure provides left and right limits on how far the front wheel 40 may be turned to the left and to the right.

Figure 23A:
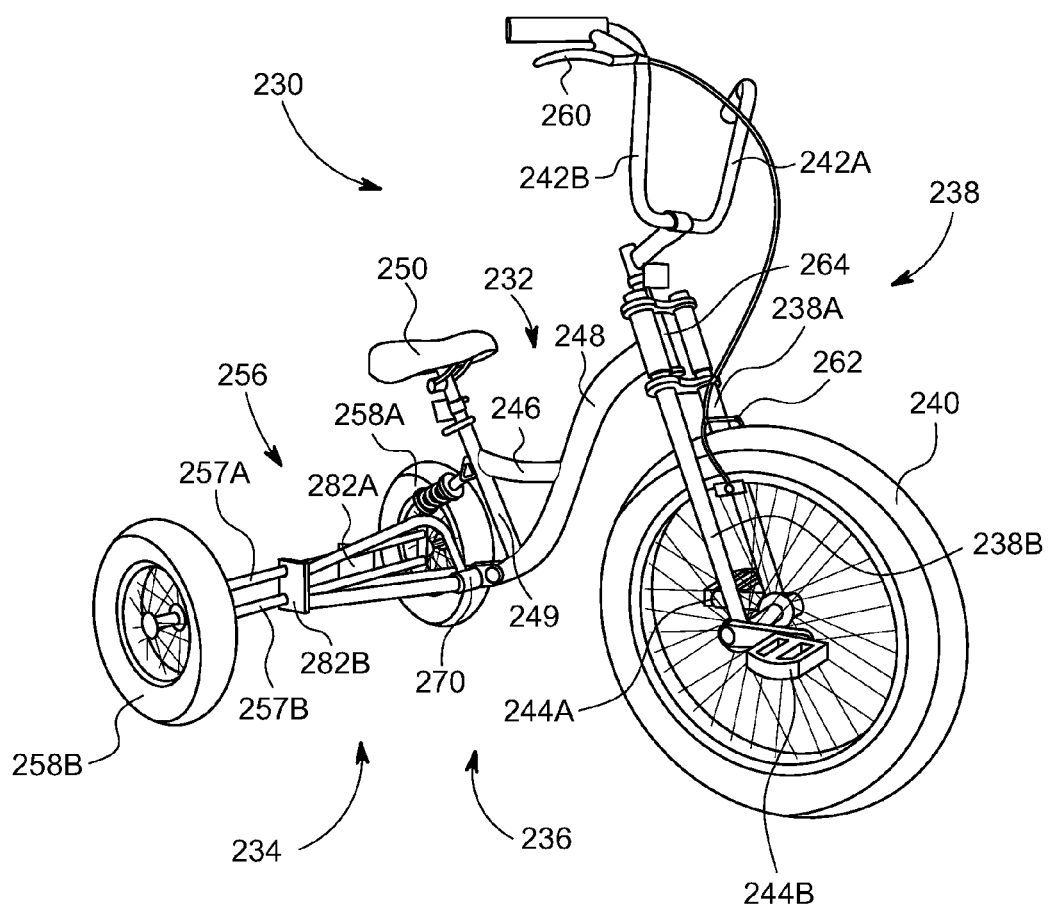
FIGS. 23A-23C shows an adult tricycle having a front frame and a rear frame pivotally connected together, and a suspension coupling the front and rear frames, in accordance with another embodiment of the present invention.
Figure 23B:
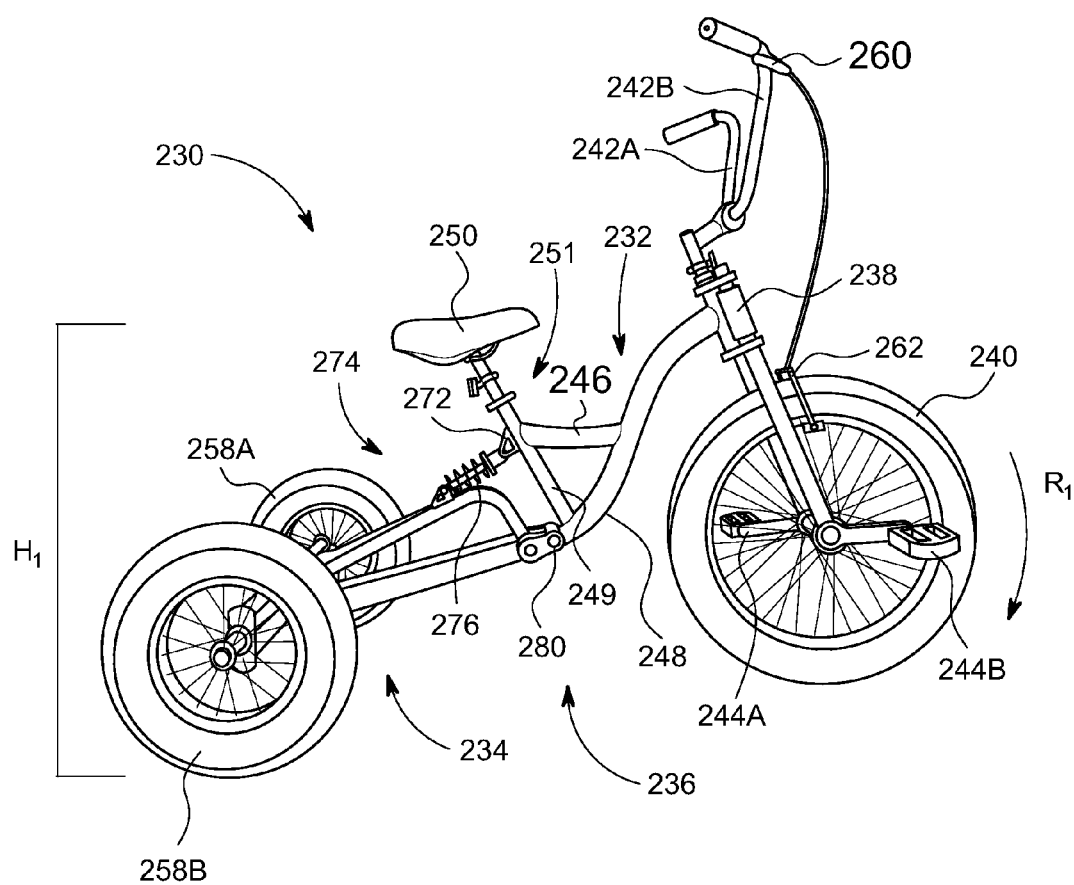
Figure 23C:
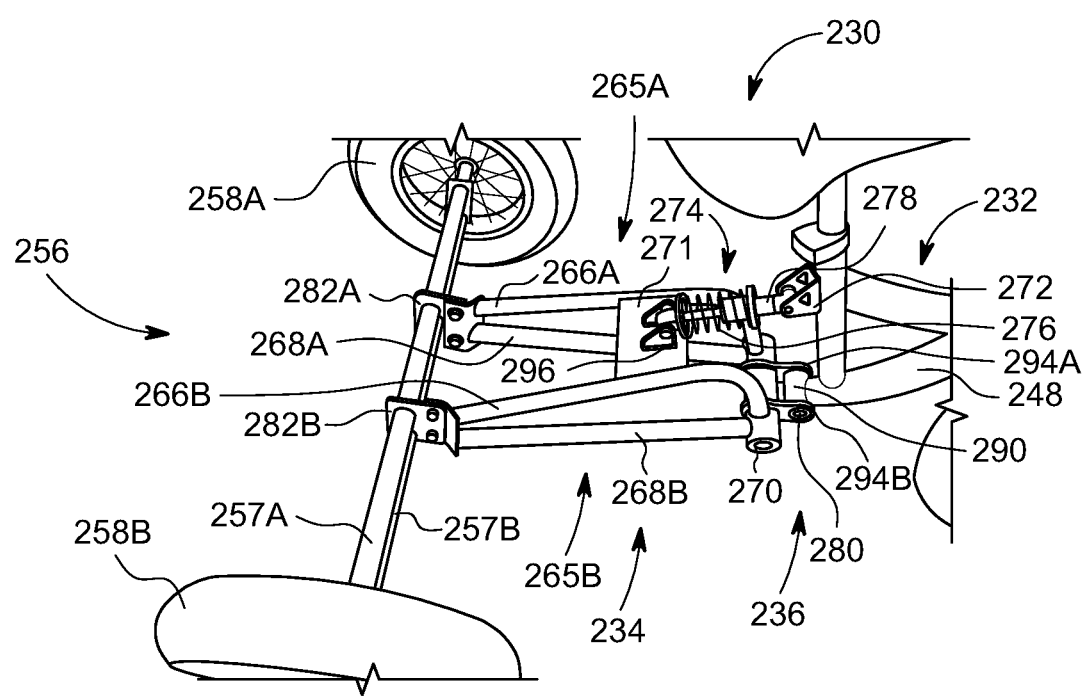

Referring to FIGS. 23A-23C, in one embodiment, an adult tricycle 230 preferably includes a front frame 232 and a rear frame 234 that are connected together at a mid-section 236. In one embodiment, the front and rear frames are pivotally connected together at a pivot point, as will be described in more detail herein. The front and rear frames may be disassembled from one another for packaging/shipment/transport, and later assembled together upon reaching a desired location. The front and rear frames may also be folded and/or collapsed together for packaging, shipment and/or transport.

Referring to FIGS. 23A and 23B, in one embodiment, the front frame 232 preferably includes a front fork 238, a front wheel 240 connected to a lower end of the front fork 238, and handle bars 242A, 242B connected with the front wheel 240 for steering the adult tricycle.

The adult tricycle 230 desirably has pedals 244A, 244B connected with the front wheel 240. The pedals 244A, 244B may be cranked (e.g., using the driver's feet) for rotating the front wheel 240 in a forward direction designated R1. In one embodiment, the pedals 244A, 244B are designed to "freewheel" relative to a rotating front wheel so that when the front wheel 240 is rotating and a rider stops pedaling, the pedals 244A, 244B will remain stationary as the front wheel 240 continues to rotate in the direction R1.

In one embodiment, the front frame 232 has a rigid Y-shape configuration including a horizontally-extending first section 246, a sloping second section 248, and a seat bar 249, having a midsection 251, that interconnects the trailing ends of the respective horizontally-extending first section 246 and sloping second section 248. In one embodiment, a rider seat 250 is preferably secured to an upper end of the seat bar 249. A trailing end of the sloping second section 248 of the front frame 232 is desirably pivotally connected with a leading end of the rear frame 234 (e.g., pivotally connected), as will be described in more detail herein.

Referring to FIGS. 23A-23C, in one embodiment, the rear frame 234 of the adult tricycle 230 desirably has a pair of rigid loops 265A, 265B that are joined together by cross support members as will be described in more detail herein.

In one embodiment, the adult tricycle 230 desirably includes a double rear axle 256 that is connected with a trailing end of the rear frame 234. The double rear axle 256 preferably has outer ends, and first and second rear wheels 258A, 258B are rotatably secured to the respective outer ends of the double rear axle 256. In one embodiment, the rears wheels 258A, 258B have a diameter of about 10-12 inches, and a width of about 2-4 inches and more preferably about 3.0 inches. In one embodiment, the rear wheels 258A, 258B are made of rubber and are filled with air.

Referring to FIGS. 23A and 23B, in one embodiment, the front wheel 240 has a diameter of about 18-22 inches and more preferably about 20 inches. In one embodiment, the front wheel 240 is made of rubber having a width of about 2-3 inches and more preferably about 2.5 inches. In one embodiment, the rubber front wheel is filled with air.

Referring to FIG. 23B, in one embodiment, when the adult tricycle 230 is placed upon a road surface for riding, the seating surface of the seat 250 has a height $H_1$ of about 25-30 inches above the ground and more preferably about 27-29 inches above the ground. In one embodiment, the height of the seat 250 may be adjusted up or down or to the front or the rear. In one embodiment, the front wheel 240 has a greater diameter than the rear wheels 258A, 258B and the seat 250 sits higher than the diameter of the front wheel. The height of the seat 250 (i.e., 25-30 inches above the ground), makes it easier for adults to mount and dismount the adult tricycle.

Referring to FIGS. 23A and 23B, in one embodiment, the adult tricycle 230 has a hand brake 260 that is mounted on the right handle bar 242B. The hand brake 260 is preferably coupled with brake calipers 262 mounted adjacent the front wheel 240. In order to brake, a rider may squeeze the hand brake 260, which, in turn, closes the brake calipers 262 onto the rim of the front wheel 240 for stopping the adult tricycle.

Referring to FIG. 23A, in one embodiment, the front frame 232 includes the fork 238 having lower ends that extend over opposite sides of the front wheel 240. A vertically extending bar 264 at the leading end of the front frame 232 and the fork 238 forms a triple tree structure that limits how far the front wheel 240 may be turned to the left and to the right. When the front wheel 240 is turned fully to the left, the left fork 238A contacts the front frame to function as a hard stop to limit the extent of turning to the left. When the front wheel 240 is turned fully to the right, the right fork 238B contacts the front frame to function as a hard stop to limit the extent of turning to the right.

Referring to FIGS. 23A-23C, in one embodiment, the rear frame 234 has two rigid loop-shaped parts 265A, 265B that are joined together by cross support members. In one embodiment, the first rigid loop-shaped part 265A includes a top frame section 266A and a bottom frame section 268A, and the second rigid loop-shaped part 265B includes a top frame section 266B and a bottom frame section 268B. A laterally extending support bar 270 interconnects the leading ends of first and second rigid loop-shaped parts 265A, 265B. A top laterally extending support plate 271 interconnects the upper or top frame sections 266A, 266B of the respective rigid loop-shaped parts 265A, 265B.

In one embodiment, the front and rear frames 232, 234 of the adult tricycle 230 are connected together at a mid-section 236 of the adult tricycle. The front and rear frames 232, 234 are desirably pivotally connected together and include a shock absorbing element, such as a spring, that dampens bumps and jolts as a driver rides the adult tricycle, and that controls pivoting movement of the front and rear frames relative to one another.

In one embodiment, the front frame 232 includes a support buttress 272 that is connected to the trailing side of the seat bar 249 of the front frame. The adult tricycle 230 preferably includes a shock absorbing element 274 having a leading end that is pivotally connected with the support buttress 272 and a trailing end that is pivotally connected with the top support plate 271 of the rear frame 234. In one embodiment, the shock absorbing element 274 desirably includes a spring 276 and a telescoping shaft 278 that controls compression of the shock absorbing element along the longitudinal axis of the telescoping shaft 278.

In one embodiment, the trailing end of the sloping second section 248 of the front frame 232 is pivotally connected with a leading end of the rear frame 234, at a location that is adjacent the lower end of the seat bar 249 of the front frame 232. In one embodiment, a split locking collar 280, as described above in FIGS. 18A-21, may be used for forming the pivotal connection between the front frame 232 and the rear frame 234.

In one embodiment, the double rear axle 256 is connected with the trailing end of the rear frame 234. The double rear axle 256 includes a first axle bar 257A and a second axle bar 257B that extend laterally across the rear of the adult tricycle 230. The first and second rear wheels 258A, 258B are rotatably mounted to the respective outer ends of the double rear axle 256.

Referring to FIGS. 23A and 23C, in one embodiment, two vertically-extending stabilizer plates 282A, 282B are utilized for interconnecting the first axle bar 257A and the second axle bar 257B for maximizing torsional stability between the first and second axle bars. In one embodiment, the stabilizer plates 282A, 282B are welded to the first and second axle bars 257A, 257B. The trailing ends of the rigid loop-shaped parts 265A, 265B are spaced from one another with the trailing end of the first rigid loop-shaped part 265A secured to the first stabilizer plate 282A and the trailing end of the second rigid loop-shaped part 265B secured to the second stabilizer plate 282B. Securing elements such as threaded fasteners and nuts may be utilized for securing the trailing end of the rear frame 234 with the stabilizer plates 282A, 282B of the double rear axle 256.

In one embodiment, the double rear axle 256 has a structure that provides improved weight distribution and torsional strength. The double rear axle having the two axle bars 257A, 257B buttressed by the stabilizer plates 282A, 282B provides greater strength and flexibility than can be attained when using a single bar for the rear axle.

In one embodiment, the adult tricycle 230 preferably has two parts, the front frame 232 and the rear frame 234, which may be assembled together. Providing two parts for the adult tricycle may make it easier to package, ship and/or transport the tricycle. In one embodiment, the adult tricycle is packaged in two separate parts, which facilitates shipping and/or transporting the tricycle. When a final destination is reached (e.g., a retail establishment, a home), the front and rear frames 232, 234 may be assemble together.

Referring to FIGS. 23A-23C, in one embodiment, the sloping section 248 of the front frame 232 has a trailing end including a bearing 290 with a laterally extending opening passing through the bearing 290. The leading end of the rear frame 234 preferably has a pair of spaced apart mounting flanges 294A, 294B, each mounting flange having an opening extending therethrough.

In one embodiment, a split locking bolt 296 is used for pivotally securing the shock absorbing element 274 with the plate 271 of the rear frame 234. The split locking bolt 296 is similar to that described above in FIGS. 16A-16B.

Figure 24A:
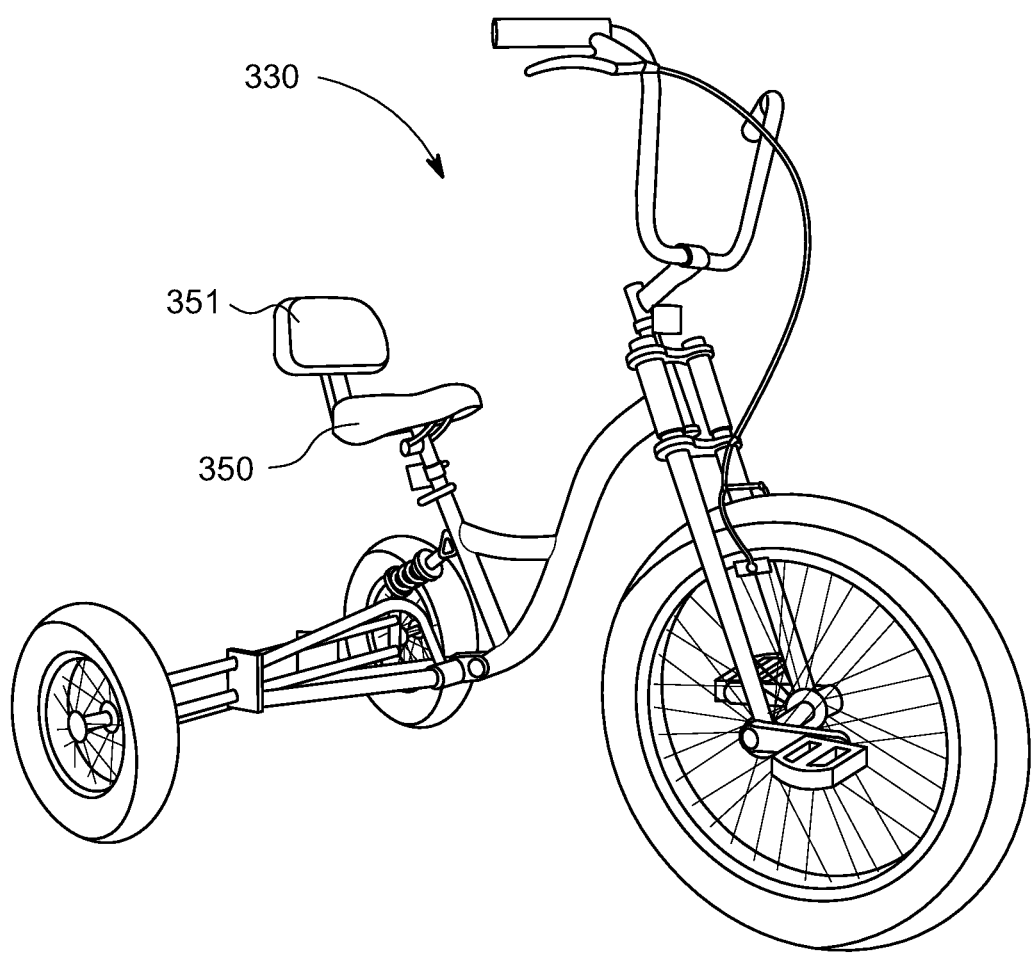
FIGS. 24A-24B show an adult tricycle having a front frame and a rear frame pivotally connected together, and a suspension coupling the front and rear frames, in accordance with yet another embodiment of the present invention
Figure 24B:
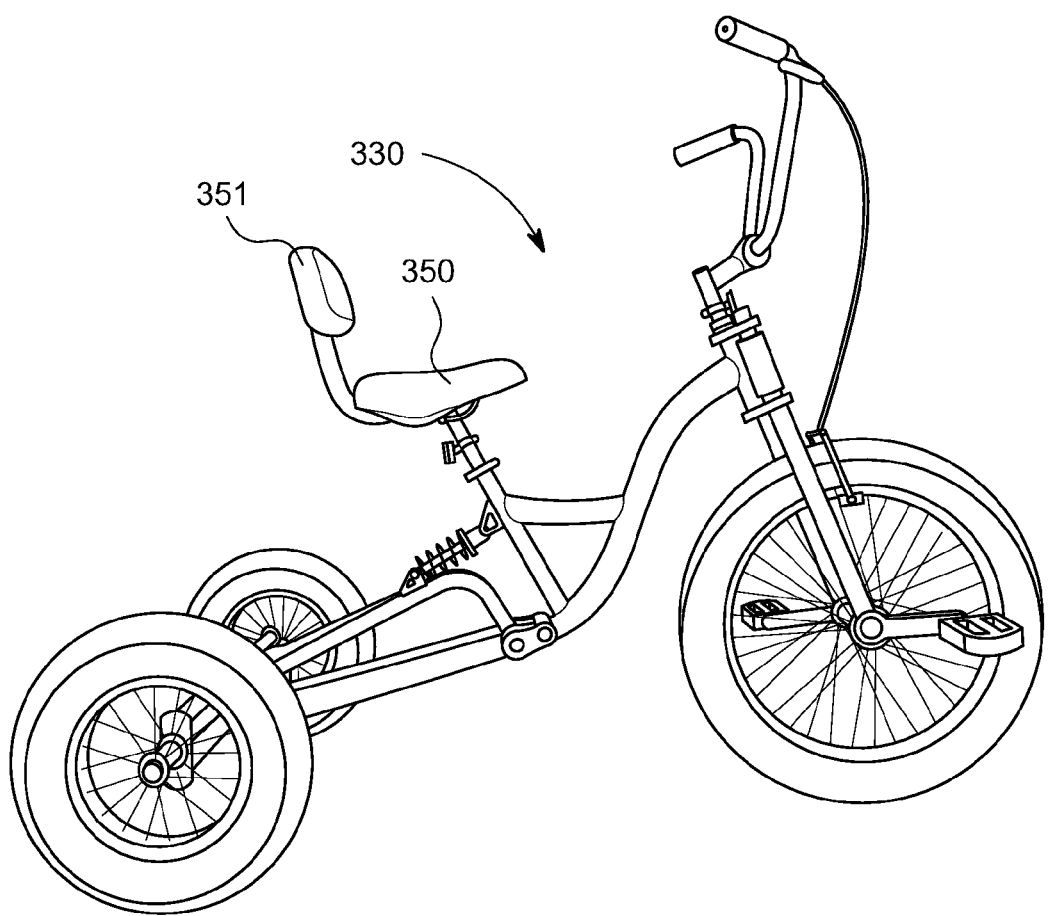

Referring to FIGS. 24A-24B, in one embodiment, an adult tricycle 330 is similar to that described above in FIGS. 23A-23C. The adult tricycle 330 has a seat 350 with a back support 351 secured to the trailing end of the seat 350.

In understanding the functional and clinical relevance to exercise utilizing the adult tricycle disclosed herein, it is necessary to differentiate between closed chain exercise and open chain exercises. Closed chain exercising occurs when the foot is fixed on a surface. Open chain exercising occurs when the foot swings freely during exercise. The benefit of closed chain lower extremity exercise includes reduced sheer stress on the knee. The adult tricycle disclosed herein provides for closed chain exercising, which provides for an increase in quadriceps muscle force production with minimal amount of sheer force produced on the knee. Quadriceps muscle force (knee extensors) production increases as the knee is extended from 90 degrees to 30 degrees. The adult tricycle disclosed herein provides this full knee range of motion in a closed chain exercise position. In addition, the adult tricycle disclosed herein provides safety and stability on a three wheeled cycle, which allows mature adults and senior citizens to be able to ride a cycle that provides enhanced stability over standard bicycles The headings used herein are for organizational purposes only and are not meant to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures.

While the foregoing is directed to embodiments of the present invention, other and further embodiments of the invention may be devised without departing from the basic scope thereof. For example, the present invention contemplates that any of the features shown in any of the embodiments described herein may be incorporated with any of the features shown in any of the other embodiments described herein and still fall within the scope of the present invention.

What is claimed is:

1. An adult tricycle comprising:
   a front frame having a leading end and a trailing end;
   a rear frame having a leading end and a trailing end;
   a pivot connection that pivotally connects the trailing end of said front frame with the leading end of said rear frame;
      a suspension system coupling said front and rear frames together for dampening pivoting movement of said front and rear frames relative to one another;
   a front wheel mounted on the leading end of said front frame, said front wheel having a diameter;
   a pair of pedals coupled with said front wheel, wherein said front wheel has a freewheel mechanism that enables said front wheel to rotate faster than said pair of pedals;
   a pair of rear wheels rotatably mounted on the trailing end of said rear frame, each of said rear wheels having a diameter;
   a seat mounted to an upper end of said front frame, wherein said front and rear wheels are adapted to ride over a riding surface, and wherein the distance between said seat and the riding surface is greater than the diameter of said front wheel;
   wherein said suspension system comprises a shock absorber including a spring and a telescoping shaft having a longitudinal shaft that controls compression of said shock absorber along the longitudinal axis of the telescoping shaft.

2. The adult tricycle as claimed in claim 1, wherein the diameter of said front wheel is at least 1.5 times greater than the diameters of said pair of rear wheels.

3. The adult tricycle as claimed in claim 2, wherein the diameter of said front wheel is about 20 inches, the diameter of each of said rear wheels is about 10-12 inches, and the distance between said seat and said riding surface is about 27-29 inches.

4. The adult tricycle as claimed in claim 1, wherein said shock absorber has a leading end pivotally coupled with the trailing end of said front frame and a trailing end pivotally coupled with the leading end of said rear frame.

5. The adult tricycle as claimed in claim 1, wherein said front frame comprises a rigid Y-shaped structure having a horizontally-extending first section, a sloping second section, and a seat bar that is connected with trailing ends of said horizontally-extending first section and said sloping second section.

6. The adult tricycle as claimed in claim 5, wherein said rear frame comprises first and second rigid loop-shaped parts, a laterally extending support bar that interconnects leading ends of said first and second rigid loop-shaped parts, and a top plate that interconnects upper portions of said first and second rigid loop-shaped parts.

7. An adult tricycle comprising:
a front frame having a leading end and a trailing end, the trailing end of said front frame including a seat bar having an upper end and a lower end;
a seat mounted on said upper end of said seat bar;
a rear frame having a leading end and a trailing end;
a pivot connection located adjacent the lower end of said seat bar for pivotally connecting the trailing end of said front frame with the leading end of said rear frame;
a suspension system having a leading end pivotally connected with said seat bar of said front frame and a trailing end pivotally connected with said rear frame for dampening pivoting movement of said front and rear frames relative to one another;
a front wheel rotatably mounted on the leading end of said front frame;
a pair of pedals coupled with said front wheel;
said front wheel having a freewheel mechanism that enables said front wheel to rotate faster than said pair of pedals;
a pair of rear wheels rotatably mounted on the trailing end of said rear frame and being free to rotate relative to said rear frame, each of said rear wheels having a diameter, wherein said front wheel has a diameter that is at least 1.5 times greater than the diameters of said rear wheels.

8. The adult tricycle as claimed in claim 7, wherein said front and rear wheels are adapted to travel over a riding surface, and wherein the distance between said seat and the riding surface is greater than the diameter of said front wheel.

9. The adult tricycle as claimed in claim 8, wherein the diameter of said front wheel is about 20 inches, the diameter of each of said rear wheels is about 10-12 inches, and the distance between said seat and the riding surface is about 27-29 inches.

10. The adult tricycle as claimed in claim 1, wherein said suspension system comprises a shock absorber including a spring and a telescoping shaft having a longitudinal shaft that controls compression of the shock absorber along the longitudinal axis of the telescoping shaft.

11. The adult tricycle as claimed in claim 10, wherein a leading end of said longitudinal shaft is pivotally connected with a midsection of said seat bar that is located between said upper and lower ends of said seat bar.

12. The adult tricycle as claimed in claim 7, wherein said rear frame comprises:
two rigid loop-shaped parts that are laterally space from one another, each said rigid loop-shaped part having a leading end and a trailing end;
a first laterally extending support interconnecting the leading ends of said two rigid loop-shaped parts;
a second laterally extending support interconnecting upper sections of said two rigid loop-shaped parts;
a double rear axle connected with the trailing ends of said two rigid loop-shaped parts, wherein said rear wheels are rotatable mounted on outer ends of said double rear axle.

13. The adult tricycle as claimed in claim 12, wherein said double rear axle comprises:
a first axle bar extending laterally at said trailing end of said rear frame;
a second axle bar extending laterally as said trailing end of said rear frame;
a first stabilizer plate connected with said first and second axle bars;
a second stabilizer plate spaced from said first stabilizer plate and being connected with said first and second axle bars;
said first stabilizer plate being connected with the trailing end of a first one of said two rigid loop-shaped parts;
said second stabilizer plate being connected with the trailing end of a second one of said two rigid loop-shaped parts.

14. The adult tricycle as claimed in claim 7, wherein said front and rear wheels comprise pneumatic rubber tires.

15. The adult tricycle as claimed in claim 7, further comprising:
a pair of handle bars coupled with said front wheel for steering said adult tricycle;
a hand brake attached to one of said handle bars for applying a braking force upon said front wheel.

16. An adult tricycle comprising:
a front frame having a leading end and a trailing end, said front frame including a seat bar and a seat mounted on an upper end of said seat bar;
a rear frame having a leading end and a trailing end;
a pivot connection located adjacent a lower end of said seat bar for pivotally connecting the trailing end of said front frame with the leading end of said rear frame;
a suspension system having a leading end pivotally connected with said seat bar and a trailing end pivotally connected with said rear frame for dampening pivoting movement of said front and rear frames relative to one another;
a front wheel mounted on the leading end of said front frame;
a pair of pedals coupled with said front wheel;
said front wheel having a freewheel mechanism that enables said front wheel to rotate faster than said pair of pedals;
a pair of rear wheels rotatably mounted on the trailing end of said rear frame and being free to rotate relative to said rear frame, wherein said front and rear wheels are adapted to travel over a riding surface, wherein said front wheel has a diameter that is greater than the diameters of said rear wheels, and wherein the distance between said seat and the riding surface is greater than the diameter of said front wheel.

17. The adult tricycle as claimed in claim 16, wherein the diameter of said front wheel is about 20 inches, the diameter of each of said rear wheels is about 10-12 inches, and the distance between said seat and the riding surface is about 27-29 inches.

18. The adult tricycle as claimed in claim 16, wherein said seat bar has a midsection located between said upper and lower ends of said seat bar, and wherein a leading end of said suspension system is pivotally connected with the midsection of said seat bar and a trailing end of said suspension system is pivotally connected with said rear frame.

19. The adult tricycle as claimed in claim 16, wherein said rear frame comprises:
   two rigid loop-shaped parts that are laterally space from one another, each said rigid loop-shaped part having a leading end and a trailing end;
   a laterally extending support bar interconnecting the leading ends of said two rigid loop-shaped parts;
   a laterally extending support plate interconnecting upper sections of said two rigid loop-shaped parts;
   a double rear axle connected with the trailing ends of said two rigid loop-shaped parts, wherein said rear wheels are rotatable mounted on outer ends of said double rear axle;
   wherein said double rear axle includes a first axle bar extending laterally at said trailing end of said rear frame, a second axle bar extending laterally at said trailing end of said rear frame, a first stabilizer plate connected with said first and second axle bars, a second stabilizer plate spaced from said first stabilizer plate and being connected with said first and second axle bars, said first stabilizer plate being connected with the trailing end of a first one of said two rigid loop-shaped parts, and said second stabilizer plate being connected with the trailing end of a second one of said two rigid loop-shaped parts.

* * * * *